(12) United States Patent  
Shum

(10) Patent No.: US 12,546,447 B2  
(45) Date of Patent: Feb. 10, 2026

(54) LIGHT DISTRIBUTION FOR NARROW CORRIDORS AND AISLES

(71) Applicant: Filament Lighting LLC, Sunnyvale, CA (US)

(72) Inventor: Frank Shum, Sunnyvale, CA (US)

(73) Assignee: Filament Lighting LLC, Sunnyvale, CA (US)

(*) Notice: Subject to any disclaimer, the term of this patent is extended or adjusted under 35 U.S.C. 154(b) by 0 days.

(21) Appl. No.: 19/068,392

(22) Filed: Mar. 3, 2025

(65) Prior Publication Data

US 2026/0009511 A1 Jan. 8, 2026

Related U.S. Application Data

(60) Provisional application No. 63/668,376, filed on Jul. 8, 2024.

(51) Int. Cl.
| | |
|---|---|
| *F21S 8/06* | (2006.01) |
| *F21S 4/28* | (2016.01) |
| *F21V 5/04* | (2006.01) |
| *F21V 5/08* | (2006.01) |
| *F21V 7/00* | (2006.01) |
| *F21V 7/04* | (2006.01) |
| *F21W 131/40* | (2006.01) |
| *F21Y 105/16* | (2016.01) |
| *F21Y 113/20* | (2016.01) |
| *F21Y 115/10* | (2016.01) |

(52) U.S. Cl.
CPC ............... *F21S 8/063* (2013.01); *F21S 4/28* (2016.01); *F21V 5/04* (2013.01); *F21V 5/08* (2013.01); *F21V 7/0091* (2013.01); *F21V 7/041* (2013.01); *F21W 2131/40* (2013.01); *F21Y 2105/16* (2016.08); *F21Y 2113/20* (2016.08); *F21Y 2115/10* (2016.08)

(58) Field of Classification Search
CPC .... F21S 8/063; F21S 4/28; F21V 5/04; F21V 5/08; F21V 7/0091; F21V 7/041
See application file for complete search history.

(56) References Cited

U.S. PATENT DOCUMENTS

| | | | |
|---|---|---|---|
| 2011/0038151 A1* | 2/2011 | Carraher | F21S 8/08 362/242 |
| 2014/0016326 A1* | 1/2014 | Dieker | F21V 5/04 362/327 |

(Continued)

*Primary Examiner* — Christopher E Dunay  
(74) *Attorney, Agent, or Firm* — Louis S. Horvath

(57) ABSTRACT

A lighting apparatus has a first light source mounted on a first planar surface that defines a horizontal plane, wherein the first light source defines a first optical axis normal to the horizontal plane. The first optical axis defines an intersection between a first vertical plane orthogonal to the horizontal plane and a second vertical plane orthogonal to both the first vertical plane and the horizontal plane. A first optic of the first light source forms a first optical distribution of luminous intensity centered upon, and asymmetrical about, the first optical axis. The first optical distribution, considered in cross-section with respect to the first vertical plane, is symmetric and in cross-section with respect to the second vertical plane, is symmetric. A second light source has a second optic that forms a second optical distribution of luminous intensity symmetric about an offset plane orthogonal to the horizontal plane.

20 Claims, 51 Drawing Sheets

(56) References Cited

U.S. PATENT DOCUMENTS

| | | | |
|---|---|---|---|
| 2022/0231207 A1* | 7/2022 | Tarsa | G02B 19/0066 |
| 2024/0126072 A1* | 4/2024 | Ai | G02B 3/0037 |
| 2024/0175566 A1* | 5/2024 | Rapeanu | F21V 5/08 |
| 2025/0305668 A1* | 10/2025 | Spiro | F21V 23/003 |

* cited by examiner

Table of Exemplary Aisle / Rack Dimensions

Ceiling Height (C)   20 – 60 ft.

Luminaire spacing (L)   10 - 100 ft.

Luminaire Mounting Height (M)   15 – 55 ft. ft.

Aisle width (W)   6 – 20 ft.

Rack Height (H)   15 – 60 ft.

Above Finished Floor (AFF) 0 – 8 ft.

Table of Exemplary Optical Simulation Parameters

| | |
|---|---|
| Floor Reflectivity | 20% |
| Wall Reflectivity | 30% |
| Rack Reflectivity | 30% |
| Ceiling Reflectivity | 50% |
| Light Loss Factor | 90% |

*FIG. 1C*

(Prior art)

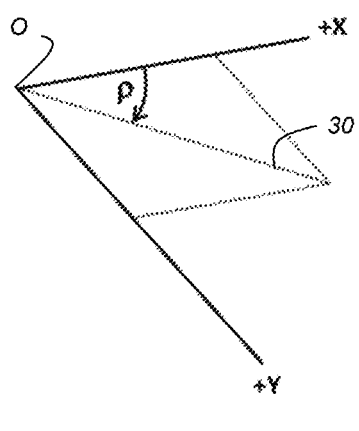 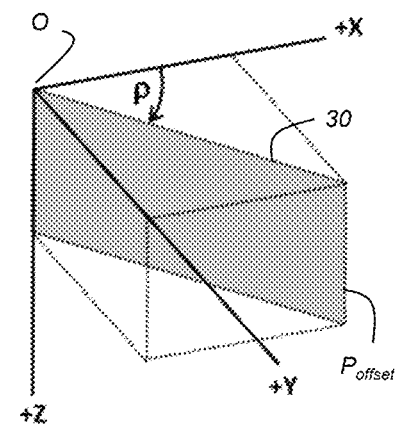
FIG. 3A  FIG. 3B

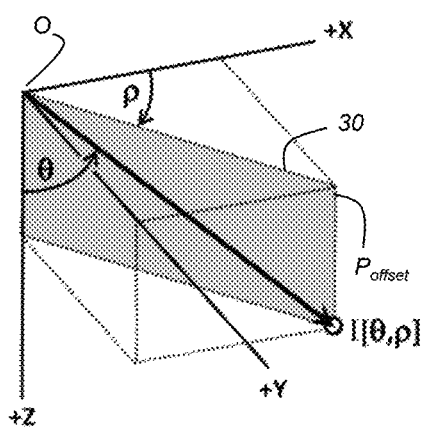
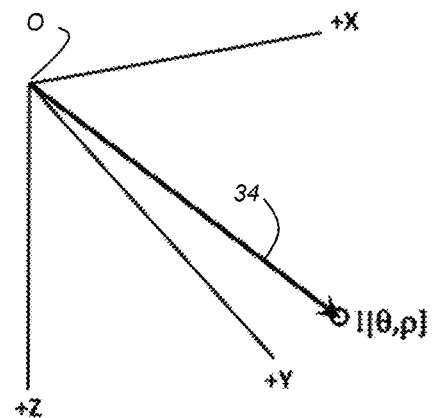
FIG. 3C  FIG. 3D

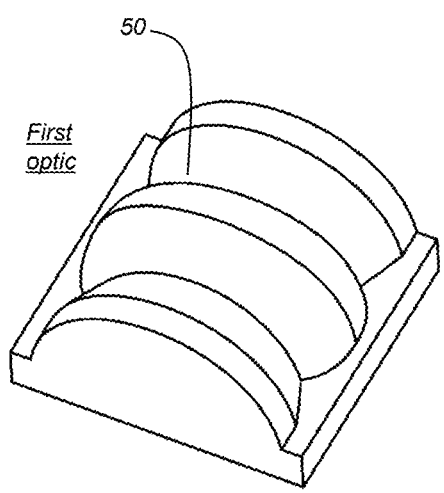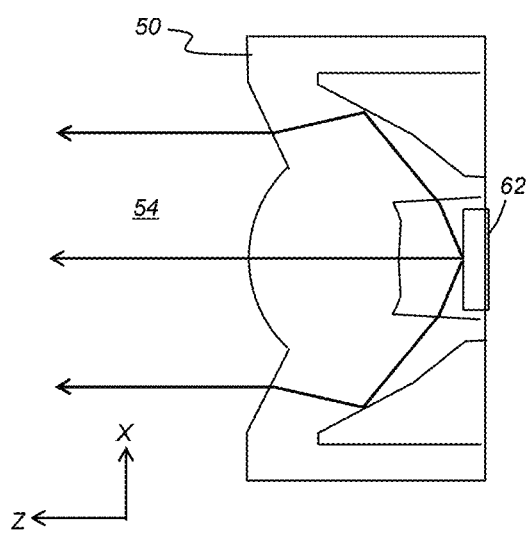
FIG. 5A
FIG. 5B
Cross-section side view along x-z plane or $\rho = 0°$ or P0 plane, narrow distribution.

Top View

Cross-section side view
along y-z plane or ρ = 90° or P90 plane,
wide distribution.

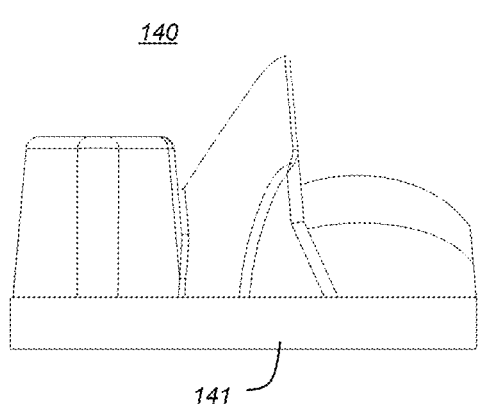 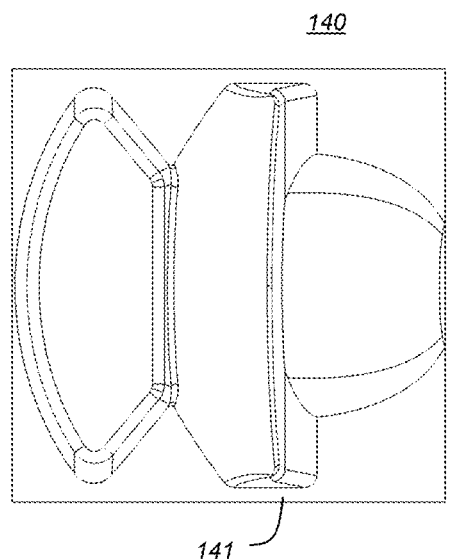
FIG. 12A
FIG. 12B

| Offset plane angle (p) degrees | VP1 width p=0° | Offset Plane (Offset Width) | | | | | | | | VP2 width p=90° | Ratio VP2/VP1 |
|---|---|---|---|---|---|---|---|---|---|---|---|
| | | p=10° | p=30° | p=40° | p=40° | p=50° | p=60° | p=70° | p=80° | | |
| FW @ 10% | 52.3 | 51.9 | 55.3 | 61.2 | 69.8 | 87.0 | 107.8 | 161.0 | 168.4 | 148.6 | 2.8 |
| FW @ 20% | 40.6 | 40.7 | 43.0 | 47.3 | 53.4 | 66.0 | 88.3 | 118.2 | 153.4 | 133.5 | 3.3 |
| FW @ 30% | 34.2 | 34.6 | 36.5 | 39.8 | 45.3 | 55.3 | 74.9 | 102.9 | 130.4 | 124.1 | 3.6 |
| FW @ 40% | 29.4 | 30.0 | 31.6 | 34.1 | 39.1 | 47.4 | 63.4 | 92.8 | 112.6 | 116.7 | 4.0 |
| FW @ 50% | 25.1 | 25.9 | 27.1 | 29.3 | 33.5 | 40.7 | 54.2 | 83.0 | 104.8 | 110.6 | 4.4 |

*Optical Intensity Distribution Full Width (FW) Angle in Degrees at Various FW% Levels Along Offset Plane Rho (p)*

Codes:
VP1 - First vertical plane (1st width)
VP2 - Second vertical plane (2nd width)

FIG. 14F

LIGHT DISTRIBUTION FOR NARROW CORRIDORS AND AISLES

CROSS REFERENCE TO RELATED APPLICATIONS

Reference is made to, and priority is claimed from, commonly assigned U.S. Ser. No. 63/668,376 filed as a provisional patent application on 8 Jul. 2024, entitled "LIGHT DISTRIBUTION FOR NARROW CORRIDORS AND AISLES" in the name of Frank Shum, incorporated herein in its entirety.

FIELD OF THE INVENTION

The present application is directed to illumination apparatus and more particularly to apparatus and methods for institutional and commercial lighting, particularly wherein the illumination source is intended to provide sufficient light for aisles and for long, narrow spaces in general.

BACKGROUND OF THE INVENTION

Light distribution for indoor applications can vary widely with the environment. To respond to differences in illumination requirements, various approaches to light fixturing have been used; no one solution adequately addresses the contrasting illumination needs of an office environment with those of manufacturing, warehousing, and other commercial environments. One particularly challenging application that requires innovative design approaches relates to aisle illumination. Broadly considered, aisle illumination encompasses environments characterized by long, narrow aisles or corridors requiring light for those passing along the aisle as well as light for identifying stacked or stored items that lie above eye level, such as in large-scale warehousing environments, for example, or where building layout provides long hallways with high ceilings.

Conventional aisle illumination solutions typically aim to provide enough light from ceiling fixtures to ensure safety and visibility at floor level. However, their standard light intensity distribution often results in excessive illumination on rack or wall areas near the light source, while leaving insufficient light in areas between fixtures. This uneven light distribution leads to over-lit zones and under-lit regions.

A common measure of light uniformity is the ratio of the minimum light level over an area to the average light level. Guidelines from the Illuminating Engineering Society (IES) recommend uniformity ratios greater than 0.5 or 0.7, depending on the environment. Techniques that simply increase the brightness of fixtures in order to broadcast more light cannot remedy poor uniformity because the uneven distribution pattern remains unchanged. A conventional approach for improving uniformity involves reducing the spacing between fixtures to increase overlap in light distribution. However, this approach has drawbacks, including higher costs for additional fixtures, installation, operation, and maintenance.

Additionally, IES (Illuminating Engineering Society) guidelines specify minimum light levels on the floor, such as 20 or 30 foot-candles for warehouse aisles. Traditional fixtures often over-illuminate racks near the light source to meet these floor-level requirements, resulting in wasted lumens and higher energy consumption, which reduces system efficiency.

Thus, it can be appreciated that there is a need for illumination solutions that address the particular demands of optical distribution for aisles and related environments for cost, efficiency, and useful distribution of the light energy.

SUMMARY OF THE INVENTION

It is an object of the present disclosure to address the need for illumination solutions for aisles and corridors and related narrow, long walkways, wherein the light source is high above the floor and near a vertical surface of the aisle or corridor.

With this object in mind, embodiments according to the present disclosure provide a lighting apparatus comprising:
(a) at least a first light source mounted on a first planar surface that defines a horizontal plane, wherein the first light source defines an origin of a first optical axis that is normal to the horizontal plane,
wherein the first optical axis defines an intersection between a first vertical plane that is orthogonal to the horizontal plane and a second vertical plane that is orthogonal to both the first vertical plane and the horizontal plane,
wherein a first optic of the first light source forms a first optical distribution of luminous intensity that is centered upon, and asymmetrical about, the first optical axis,
and wherein the first optical distribution:
  (i) considered in cross-section with respect to the first vertical plane, is symmetric, and
  (ii) considered in cross-section with respect to the second vertical plane, is symmetric;
and
(b) at least a second light source having a second optic that forms a second optical distribution of luminous intensity that is symmetric about an offset plane that is orthogonal to the horizontal plane and wherein the offset plane is coincident to the first optical axis and is skewed from the first vertical plane by an angle $\rho$ between 60 and 88 degrees;
and wherein the combined first optical distribution and second optical distribution form a total optical distribution that:
  (i) considered in cross-section with respect to the first vertical plane has a first cross-section luminous intensity distribution having a first width;
  (ii) considered in cross-section with respect to the second vertical plane has a second cross-section luminous intensity distribution having a second width that exceeds the first width;
  (iii) considered in cross-section with respect to the offset plane has an offset cross-section luminous intensity distribution having an offset width.

With this object in mind, embodiments according to the present disclosure further provide a method comprising a method of illuminating a corridor, the method comprising:
mounting, at a first height above a floor surface, at least a first lighting apparatus that has one or more light sources that lie along a horizontal plane and that define a first optical axis that is normal to the horizontal plane and that extends toward the floor surface of the corridor that is parallel to the horizontal plane,
wherein, the first optical axis further defines an intersection between a first vertical plane that is orthogonal to the horizontal plane and extends across the corridor and a second vertical plane that is orthogonal to both the first vertical plane and the horizontal plane and extends along the corridor;

configuring the first lighting apparatus to provide a total distribution of light that has a luminous intensity that is centered upon, and asymmetrical about, the first optical axis, wherein the total distribution of light:
(i) considered in cross-section with respect to the first vertical plane has a first cross-section luminous intensity distribution with a first width, wherein the first full width at 50% center luminous intensity spans less than 40 degrees and wherein the first full width at 10% center luminous intensity spans less than 67 degrees;
(ii) considered in cross-section with respect to the second vertical plane has a second cross-section luminous intensity distribution with a second width that exceeds the first width, wherein the second full width at 50% center luminous intensity is between 63 and 120 degrees and the second full width at 10% center luminous intensity is between 141 and 170 degrees.

BRIEF DESCRIPTION OF DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

FIG. 1C includes tables that show exemplary values for typical dimensions of interest in the aisle illumination environment.

FIGS. 3A-3D define a 3D coordinate system having orthogonal x, y, and z axes for describing aisle illumination.

FIG. 5A is a perspective view that shows a lens as an optic for providing the needed light distribution for suitable illumination.

FIGS. 5B, 5C, and 5D show various views of a lens and overall light behavior for illumination along orthogonal planes, as described herein.

FIGS. 12A and 12B are perspective views that show side and top views, respectively, of the light-redirecting optics that can be mounted on the LED array plane.

FIG. 14F shows the data used for FIG. 14E in tabular form.

DETAILED DESCRIPTION OF THE INVENTION

Figure 1A:
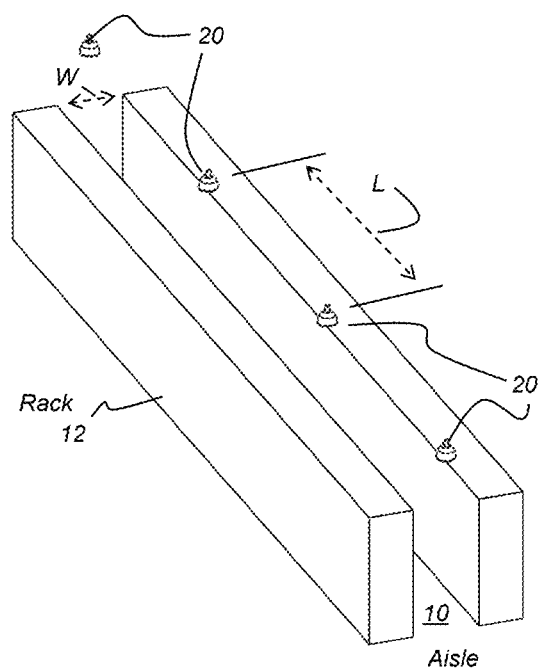
FIG. 1A is a perspective view that shows a number of features and terms used with respect to aisle lighting.

Figures provided herein are given in order to illustrate principles of operation and component relationships according to the present invention and may not be drawn with intent to show actual size or scale. Some exaggeration may be necessary in order to emphasize basic structural or functional relationships or principles of operation. Some conventional components that would be needed for implementation of the described embodiments, such as support components used for providing power, for packaging, and for mounting, for example, may not be shown in the drawings in order to simplify description. In the drawings and text that follow, like components are designated with like reference numerals, and similar descriptions concerning components and arrangement or interaction of components already described may be omitted.

Where they are used, the terms "first", "second", and so on, do not necessarily denote any ordinal or priority relation, but may be used for more clearly distinguishing one element or time interval from another. The term "plurality" means at least two. The term "exemplary" relates to example embodiments and applications that illustrate typical setup and use for the sake of description, without connoting preference or limitation.

In the context of the present disclosure, the term "energizable" describes a component or device that is enabled to perform a function upon receiving power and, optionally, upon also receiving an enabling signal.

In the context of the present disclosure, the term "symmetric" refers to being substantially symmetric rather than perfectly symmetric and relates to expectations and practices familiar to those skilled in the illumination design arts. For example, description of an optical intensity distribution as symmetric indicates that the distribution is substantially symmetric, with the design and layout arrangement of components intended to produce a symmetric pattern. For example, optical components, such as LEDs and lenses, themselves are physically arranged and configured with requisite geometric symmetry that clearly exhibit the intent to produce a symmetric distribution; however, due to practical limitations in components fabrication and to assembly tolerances between components, the resulting optical distribution may not be perfectly symmetric.

In the context of the present disclosure, positional terms such as "top" and "bottom", "upward" and "downward", and similar expressions are used descriptively, to differentiate different surfaces or views of a device and do not describe any necessary orientation of the device.

In the context of the present disclosure, the term "coupled" is intended to indicate a mechanical association, connection, relation, or linking, between two or more components, such that the disposition of one component affects the spatial disposition of a component to which it is coupled. For mechanical coupling, two components need not be in direct contact, but can be linked through one or more intermediary components.

The term "set" as used herein, refers to a non-empty set, as the concept of a collection of elements or members of a set is widely understood in elementary mathematics. The term "subset", unless otherwise explicitly stated, is used herein to refer to a non-empty proper subset, that is, to a subset of the larger set, having one or more members. For a set S, a subset may comprise the complete set S. A "proper subset" of set S, however, is strictly contained in set S and excludes at least one member of set S.

In the context of the present disclosure, the term "substantial" has its conventional meaning, generally equivalent "to a first approximation" and within a few percent of an exact value or measurement relationship. In the context of the present disclosure, the term "about", when used with reference to a measurement, means within expected tolerances for measurement error and inaccuracy that are considered to be acceptable in practice to those skilled in the optical and illumination arts. Some reasonable tolerance must be allowed, for example, for measurement differences, fabrication accuracy, and sensor resolution.

The term "at least one of" is used to mean one or more of the listed items can be selected. The term "about" indicates that the value listed can be somewhat altered, as long as the alteration does not result in nonconformance of the process or structure to the illustrated embodiment. Finally, "exemplary" indicates the description is used as an example, rather than implying that it is an ideal.

In the context of the present disclosure, the term "oblique" means at an angle that is not an integer multiple of 90 degrees. Two planes, for example, are considered to be oblique with respect to each other if they diverge from or converge toward each other at an angle that is at least 5 degrees or more away from parallel, or at least 5 degrees or more away from orthogonal. The terms "corridor" and "aisle" are considered to be equivalent with respect to the aspects of illumination addressed in the present application.

As used herein, the term full width (FW) relates to a distance between points of the distribution curve at which the given values are a percentage of the central value of the distribution, as the concept is applied by those skilled in the lighting/illumination arts, such as half or 50% of the central value of a distribution, for example. The central value itself may or may not be the maximum value of the distribution. For some distributions, full-width FW values at specific percentages (including FW values at other than 50%) can give useful information about the relative shape of the distribution. Thus, for example, full-width metrics for measured values at 10%, 20%, 30% or other percentages of the center value can be useful.

In the context of the present disclosure, the term "lobe" relates to optical intensity distribution. An optical intensity lobe or, simply, lobe, is a well-defined region or volume in which measured or calculated light intensity exceeds the light intensity in a surrounding area. More formally, a "lobe" typically refers to a contiguous zone bounded by intensity minima and containing a local maximum (peak). Lobes appear prominently as "bumps" or "peaks" in a light intensity pattern.

In the context of the present disclosure, the terms "illumination axis" and "optical axis" are considered to be equivalent.

In the context of the present disclosure, the term "array" has its standard meaning as conventionally used in the optical design arts, denoting an aggregate of individual components arranged to cooperate in providing a radiative or sensing function over an area. For example, multiple LEDs can be arranged in an array, typically with the LEDs formed on or against the same planar substrate. Similarly, multiple lenses can be formed as an array, typically in a planar arrangement. An array of LEDs can be paired with an array of lenses to form an array of light sources.

The perspective view of FIG. 1A shows, schematically, a number of features and terms inherent to warehousing and other environments that present aisle lighting requirements. A narrow aisle 10 of a width W that is much shorter than the length of the aisle 10 passage can be defined between vertical obstructions, such as walls and racks 12, leaving constrained space for lighting from above, often familiarly termed high-bay lighting. An overhead lighting apparatus 20, or illumination apparatus, can use single or multiple luminaires or other type of high-lumen device commonly used in commercial environments, with apparatus 20 typically spaced apart over aisle 10 by a length spacing L.

Figure 1B:
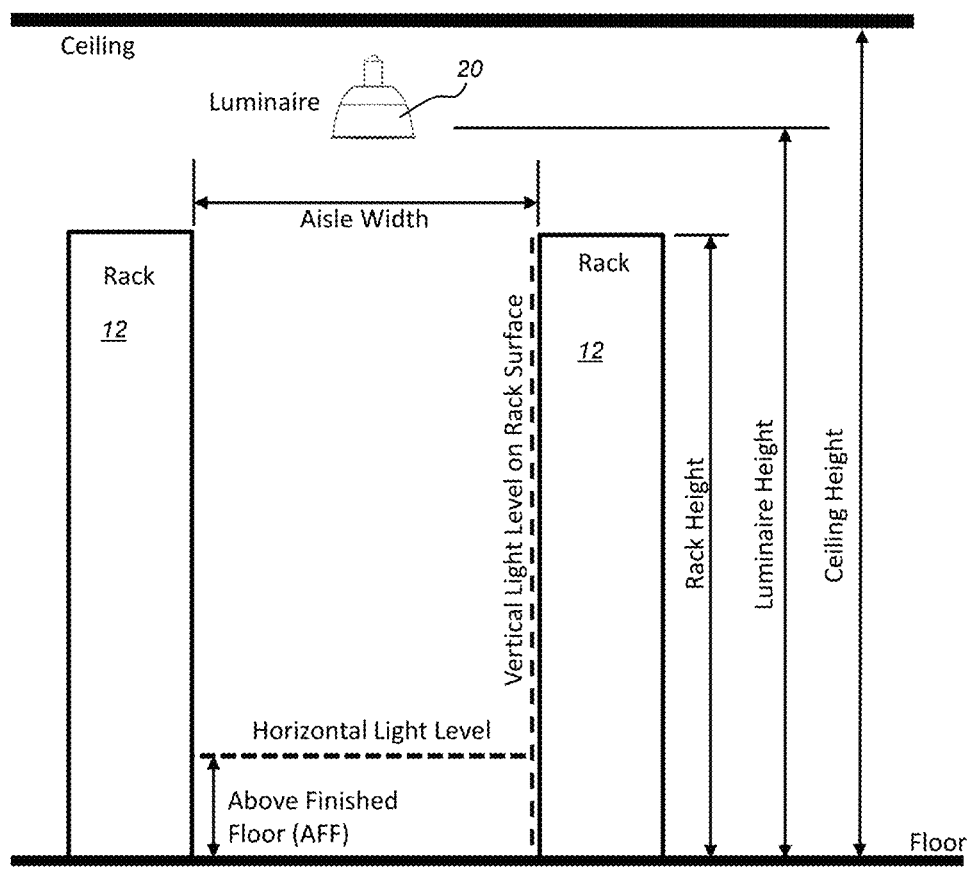
FIG. 1B is a diagram that shows various parameters related to high rack or aisle geometry.

FIG. 1B is a diagram that shows various parameters related to high rack and aisle geometry.

Tables in FIG. 1C show exemplary values for typical dimensions of interest in the aisle illumination environment.

For light from a luminaire or similar fixture used as a light source in commercial lighting environments, light output is measured in terms of luminous flux, in units of lumens (L). Light distribution is considered as a function of intensity (I) as exhibited at particular angular directions and distance from the luminaire light source. Luminous intensity (I) can be expressed in units of candelas (cd), which relate lumens to solid angle (lumens/steradians), with the light source at the origin of the spherical coordinate system. The Illuminating Engineering Society (IES) specifies a standard definition for the Luminous intensity (I) in a text format IES file, as specified in standard ANSI/IES LM-63-19, well known to those skilled in the art. Illuminance (E) is a measure of the light level on a surface, typically measured in terms of lumens per square foot or foot-candle (fc). Illuminance (E) can alternately be stated in terms of lumens per square meter (lux).

Figure 2:
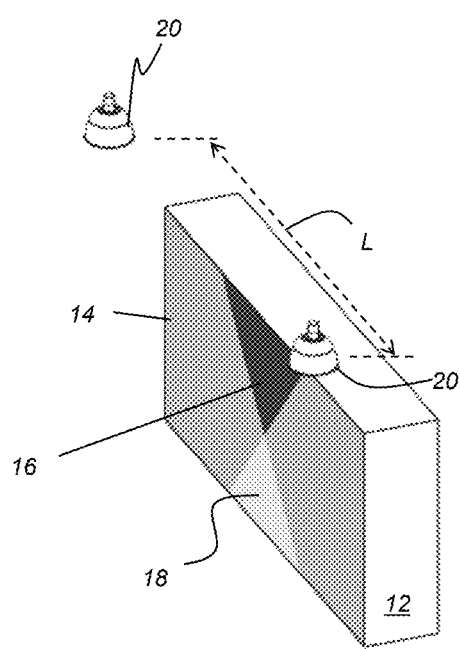
FIG. 2 is a schematic diagram that shows the overlapping light distribution for two adjacent overhead lighting apparatus relative to a generally vertical surface in a typical aisle lighting application.

The schematic diagram of FIG. 2 is intended to clarify, as a cutaway representation of a portion of FIG. 1A, aspects of the overlapping light distribution for two adjacent overhead lighting apparatus 20 relative to a wall, rack 12, or other generally vertical surface in a typical corridor or aisle lighting application. An area 14 of the vertical surface is illuminated primarily from the nearest luminaire or other lighting apparatus 20, with the emitted light having a shape characteristic of a cone of light from apparatus 20. Another area 18, midway between adjacent light apparatus 20 and nearest the floor, receives light from each neighboring apparatus 20. A light-deprived area 16, at an upper height and high angle θ (described in more detail subsequently) that lies above area 18, is poorly illuminated, receiving little or no light from the nearby lighting apparatus 20. Although a single light-deprived zone 16 is shown in the FIG. 2 schematic, for each luminaire, a total of 4 light deprived zones can be identified. These regions are located before and after each luminaire on the same rack/wall surface. In an aisle lighting application, the number of light-deprived regions can be multiplied by two for each side of rack/wall surfaces.

A uniformity ratio $\sigma_0$ can be defined based on a minimum illuminance divided by average illuminance received on the vertical, horizontal, or other surface. IES recommendations for uniformity ratio include:
minimum to average $\sigma_0 > 1/3$;
average to minimum of $1/\sigma_0 < 3$.

Alternatively, the IES also has recommendations for different applications of uniformity ratio $\sigma_0$ greater than 0.5 or greater than 0.7.

Total light output affects the average illuminance $E_{avg}$. However, average area illuminance $E_{avg}$ does not affect the uniformity ratio co. Thus, simply increasing the number of lumens emitted from lighting apparatus 20 does not help to improve the uniformity ratio. Light distribution, on the other hand, is used by the Applicant to change the uniformity ratio Go achieved by lighting apparatus 20.

A luminaire spacing criterion (SC=L/M) defines luminaire spacing L, divided by luminaire height M.

Conventional luminaire lighting distribution limits SC<1 while maintaining a uniformity on the rack 12 vertical surface of $\sigma_0 > 1/3$. Poor uniformity often prompts an increase in lumen level in order to obtain the minimum required illuminance. Even where the minimum illuminance may be achieved, the uniformity often remains poor, with $\sigma_0 < 1/3$, typically causing upper areas near nearest to the luminaire apparatus 20 to have significantly higher illuminance than is required, thus wasting lumens. The Applicant solution provides lighting distribution to enable wider spacing, for example, with exemplary spacing criterion values of SC>1, 1.25, 1.5, 1.75, 2, 2.5, or 3.0 while maintaining a uniformity on the rack vertical of $\sigma_0 > 1/3$. In addition, the Applicant solution provides lighting distribution so that vertical uniformity can exceed 0.33, for example $\sigma_0 > 0.33$, 0.4, 0.5, 0.6, 0.7, 0.8, 0.85, or 0.9. As a result, at the same spacing used for conventional illumination significantly fewer lumens may be required, or at the same lumens value, significant spacing improvement can be achieved.

Figure 4A:
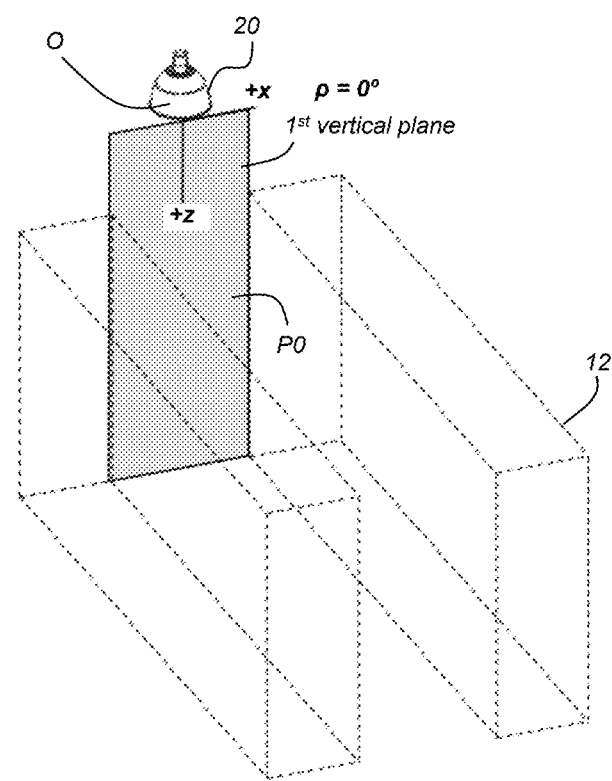
FIGS. 4A, 4B, and 4C show planes of interest for characterizing aisle illumination.
Figure 4B:
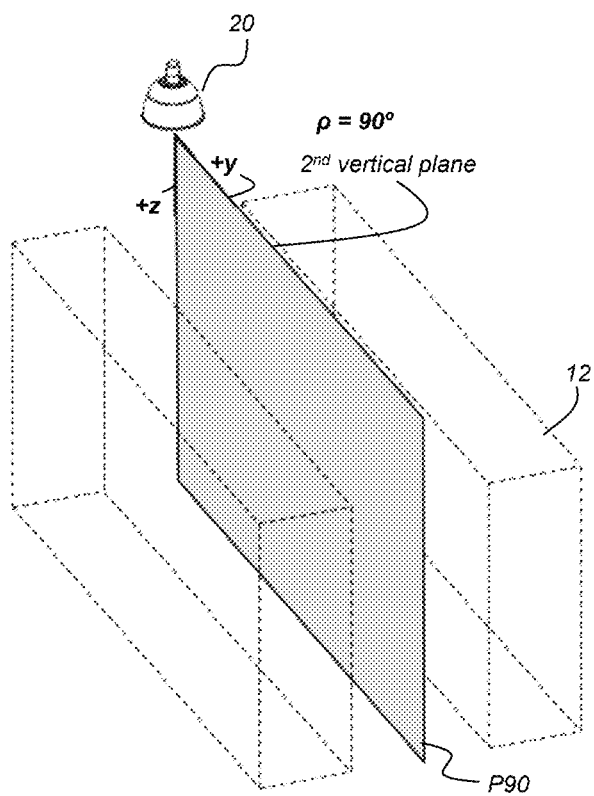

In order to show how the Applicant solution improves over conventional approaches, it is useful to describe a coordinate system with a set of related reference planes and various relative angles. FIGS. 3A-3D define a 3D coordinate system having orthogonal x, y, and z axes and an origin O at the first light source or at the center of the overall lighting apparatus. The z-axis, extending from origin O, is considered the primary illumination axis for lighting apparatus 20 and can be considered as the first optical axis; the optical axis defines an intersection between the first vertical plane and second vertical plane. The first vertical plane, at angle $\rho=0°$, is alternatively designated as plane P0, as shown in FIG. 4A. The second vertical plane P90 is at angle $\rho=90$, as shown in FIG. 4B. An angle $\rho$ (Greek "rho") in the x-y plane (the horizontal plane parallel with the floor for aisle lighting embodiments) and indicated by a line 30 is depicted in FIGS. 3A, 3B and 3C. An offset $\rho$ plane $P_{offset}$ can be defined, orthogonal to the x-y plane, passing through or coincident to the z-axis or parallel to the z-axis, and passing through or coincident to line 30.

Line 30 indicates the angular orientation of the offset ρ plane relative to x-z and y-z planes. Light can travel along an angle of elevation θ from the optical axis or from the horizontal x-y plane and passing below the x-y plane toward point I[θ, ρ], as shown in FIGS. 3C and 3D. Angle of elevation θ as shown in FIGS. 3C and 3D can be referenced to the z-axis (or alternately, can be referenced to the horizontal x-y plane) as shown. Angle of elevation θ can be considered as an inverse "tilt" angle, tilted away from the x-y plane, wherein the x-y plane itself is assigned a 90 degree value for its elevation angle θ. As described in more detail subsequently, of particular interest for aisle illumination is an elevation angle range for light that is symmetric about plane $P_{offset}$ and that is maximized or centered along angles θ away from the horizontal plane, as represented in FIG. 3C; plane $P_{offset}$ is indicated by a line 34 extending away from the x-y planar surface (θ=90 degrees) and at an angle θ that is within 30 degrees of the x-y planar surface (alternately considered, angle θ, measured from the z-axis as in FIG. 3C, between 60 and 90 degrees). Line 34 (FIG. 3D) indicates direction of a second optical axis for a second illumination distribution.

Figure 4C:
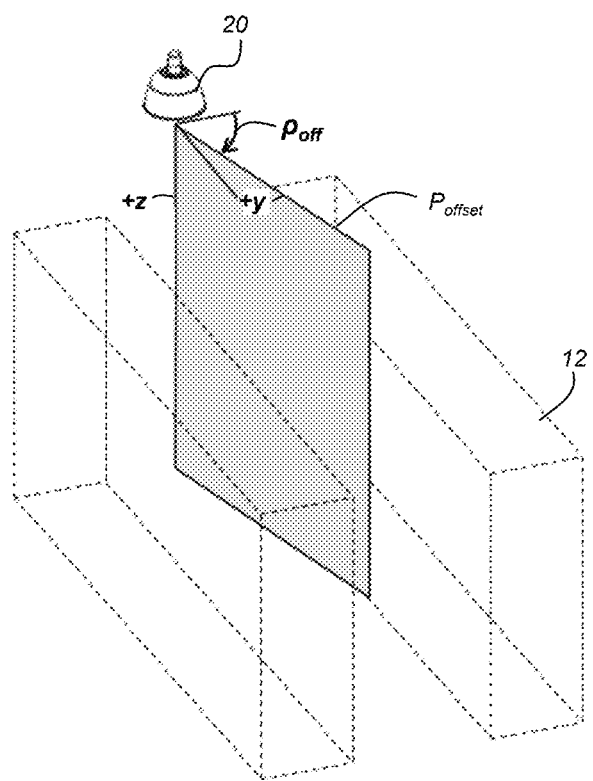

As shown in FIGS. 4A, 4B, and 4C, three vertical reference planes of interest are used herein to characterize the aisle illumination and light distribution obtained by the Applicant design. FIG. 4A shows first vertical plane P0 (ρ=0° plane or rho=0° plane), orthogonal to the x,y plane of lighting apparatus 20 as shown in FIGS. 3A, 3B and as described subsequently. FIG. 4B shows second vertical plane P90 (ρ=90° plane or rho=90° plane), orthogonal to the first vertical plane P0. Each plane in FIGS. 4A, 4B, and 4C contains the z-axis defined by the light fixture at the origin O, wherein the z axis extends downward from the light fixture and intersects or defines the intersection of each of the three planes P0, P90, and $P_{offset}$. A skew or offset plane (at angle $\rho_{off}$), labeled $P_{offset}$ herein, is at a relative angle ρ, also referred to as $\rho_{off}$, from the first vertical plane; angle $\rho_{off}$ corresponds to the orientation of the plane relative to an aisle width or corridor length, as shown in FIGS. 4A, 4B, and 4C. For reference in the present disclosure, the plane extending along offset angle ρ can be labeled as the $\rho_{off}$ or $P_{offset}$ plane. This plane extends from the z axis in both +/− directions; for convenience, only the + axis is shown in figures herein. At ρ=0 degrees, an x-z plane P0, the first vertical plane, is considered to extend across or along the aisle width W as shown in FIG. 4A. At p=90 degrees, a second vertical plane, y-z plane P90, orthogonal to plane P0, is considered to extend along the aisle length as shown in FIG. 4B. At some oblique offset angle $\rho_{offset}$ or $\rho_{off}$ degrees, measured from the x-z plane as shown in the top view of FIG. 4D, offset plane $P_{offset}$ is considered to extend between the z axis and a vertical surface (such as a corridor wall or rack 12 surface). Offset plane of angle $\rho_{off}$ in the FIG. 4C example extends to the aisle side surface at a position at approximately half the distance between two adjacent lighting apparatus 20. In practical application for characterizing the illumination provided for aisle lighting, oblique offset angle $\rho_{off}$ can diverge by about 45-85 degrees from the x-z plane P0 shown in FIG. 4A. An exemplary value for angle $\rho_{off}$ in a warehousing application can be 78 degrees.

Figure 4D:
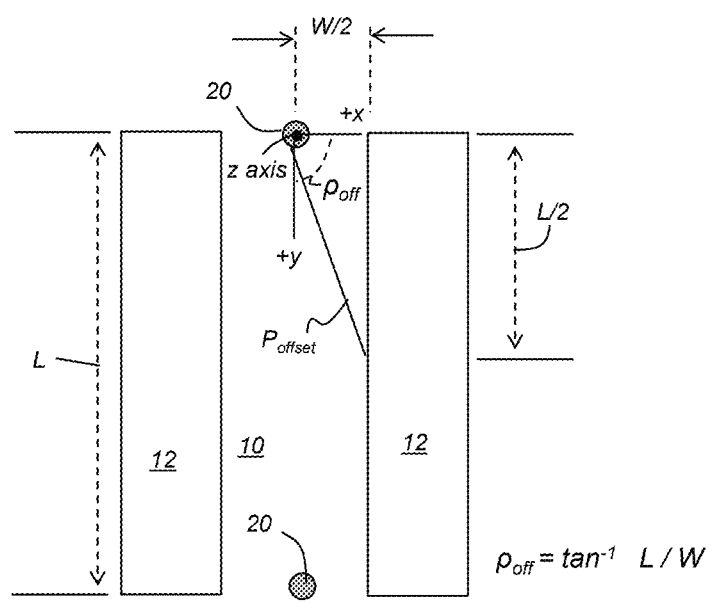
FIG. 4D is a schematic diagram showing a top view of an offset angle for illumination measurement according to an embodiment of the present disclosure.

FIG. 4D is a schematic diagram showing a top (overhead) view of an oblique angle $\rho_{off}$ in relation to aisle 10 and racks 12 in a typical aisle illumination arrangement. According to an embodiment of the present disclosure, where length L=45.5 ft., width W=8 ft., the center of the light-deprived zone is at an offset angle of $\rho_{off}$=tan-1 (L/W)=80 degrees, corresponding to offset plane $P_{offset}$. In other embodiments, the offset angle of $\rho_{off}$ and offset plane $P_{offset}$ need not coincide exactly at the center of length L along the aisle, but can generally be oriented toward a point in the area between two adjacent lighting apparatus 20.

Lighting Apparatus 20

Lighting apparatus 20 is energizable to direct a suitable amount of light for aisle or corridor illumination, redirecting at least some light along offset plane $P_{offset}$ into portions of the aisle at higher angles of elevation, angle θ in FIGS. 3C and 3D, in order to correct for lack of light at light-deprived area 16 as shown in FIG. 2. According to an embodiment of the present disclosure, lighting apparatus 20 has multiple light sources, each based on combination of an LED emitter paired with a corresponding lens or set of lenses or other optics to concentrate or otherwise condition the light. The lens optics shape the light output from a light emitter in order to provide suitable illumination intensity with respect to the requirements of each plane P0, P90, and $P_{offset}$, as described hereinabove.

FIG. 5A shows a perspective view of a lens 50 as an optic for conditioning the LED light or other light from an energized emitter 62 (FIG. 5B) to provide the needed light distribution for conveying suitable illumination in each direction. Lens 50 is configured as part of a light source 54 that can shape the light distribution for any of a number of types of light emitters 62, such as surface-mount LEDs. For light source 54, each lens 50 can be paired with a corresponding LED emitter 62 so that, for example, 200 lenses 50 are distributed in a pattern to direct light from a corresponding array having 200 LEDs. Other arrangements are possible, including grouping multiple LED emitters 62 under each lens in the lens array. According to an embodiment of the present disclosure, this type of configuration can provide a total light output in the range of 10,000 to 100,000 lumens from a single lighting fixture for overhead lighting.

Figure 5C:
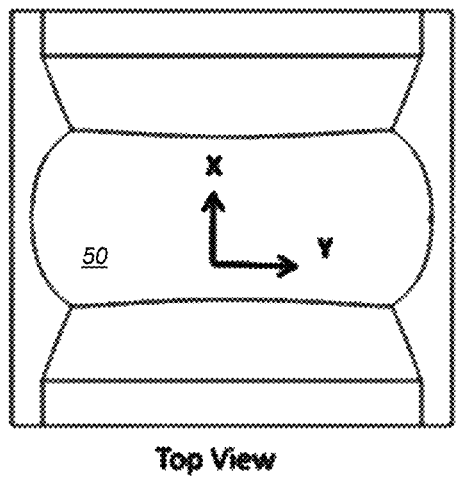
Figure 5D:
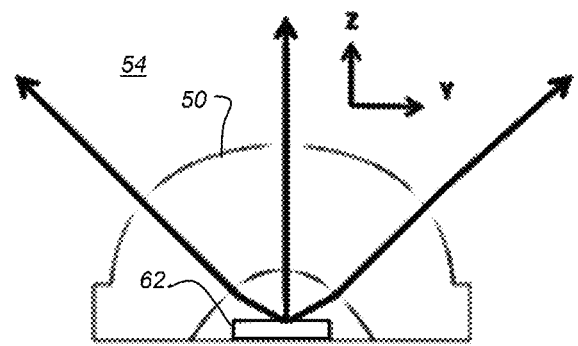

FIGS. 5B, 5C, and 5D show various views of lens 50 and its overall light behavior for illumination, relative to vertical planes P0 and P90. Symmetric in the x-z plane, lens 50 is suitable for conditioning the light for distribution in the plane P0 direction, as defined herein. FIG. 5B is a side view cross-section showing the relatively narrow distribution for the x-z plane P0 light through lens 50. Full width (FW) at 50% distribution for the P0 light from this direction is typically less than 40 degrees, measured about the z-axis, but may be less than 30 degrees or even less than 20 degrees in the direction along the x-z plane, for example.

Lens 50 in the example of FIGS. 5A-5D can also be symmetric in the y-z plane, for directing light at wider angles along the aisle in the y-z plane P90 direction. FIG. 5C shows x and y axes relative to lens 50, using the axis orientation used previously in FIGS. 3A-4D. FIG. 5D is a cross-sectional view taken orthogonally with respect to the view in FIG. 5B, showing the relatively wide angular distribution of light along the plane P90 direction. For the LED light conditioned by lens 50, FW at 50% along plane P90 can exceed 60 degrees, or can even exceed higher angular values, such as greater than 70, 80, 90, 100, 110, or even 120 degrees, for example.

Figure 6A:
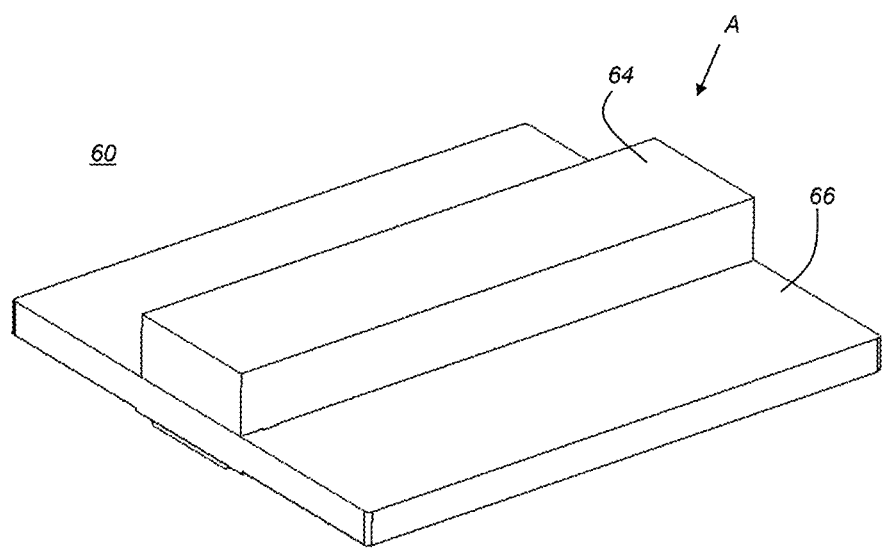
FIG. 6A is a perspective view that shows the back side of a lighting apparatus.
Figure 6B:
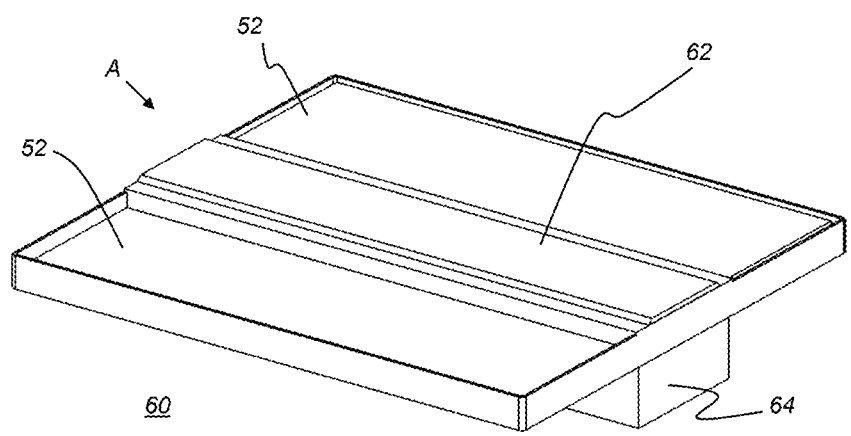
FIG. 6B is a perspective view that shows the opposite side of lighting apparatus from the view of FIG. 6A.
Figure 6C:
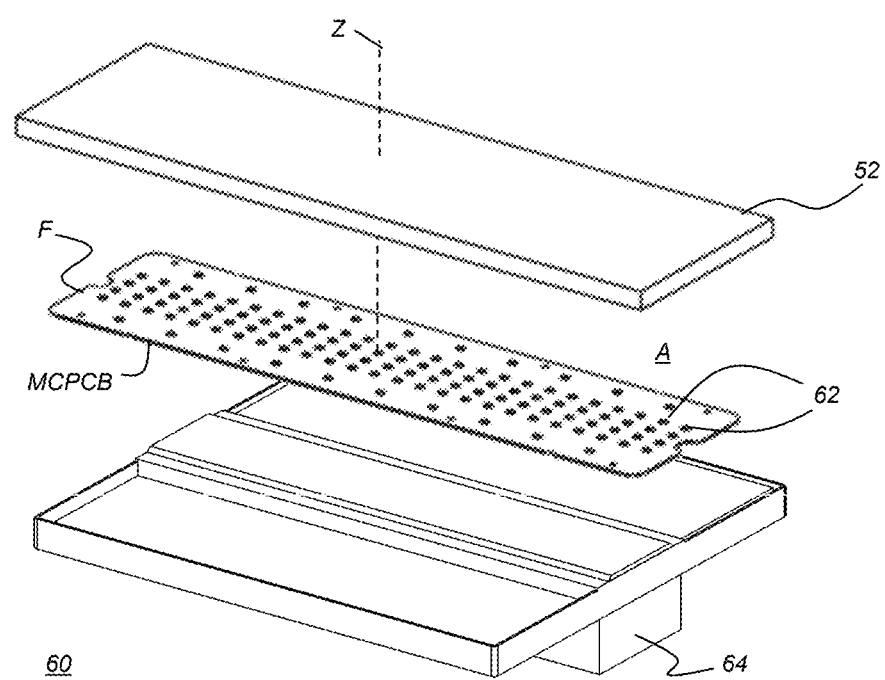
FIG. 6C shows a configuration in exploded view, with LEDs mounted on an MCPCB, which is aligned with lenses in a lens array.

FIGS. 6A, 6B, and 6C show perspective views of a lighting apparatus 60 having a first array A of first LEDs 62, each LED 62 paired with a corresponding first lens 50 from an LED lens array 52, as described previously. FIG. 6A shows the back side of lighting apparatus 60, having a housing 64 for driver enclosure and a heatsink 66. FIG. 6B shows the opposite side of lighting apparatus 60 from FIG. 6A, lighting apparatus 60 having one or more first LED lens arrays 52.

FIG. 6C shows an apparatus 60 configuration in an exploded view, with first LEDs 62 mounted on an MCPCB (metal core printed circuit board), which aligns first LED emitters 62 with lenses 50 (not shown) in first lens array 52. Arrayed LEDs 62 can be on a single plane F, such as a plane parallel to, or coincident with, the MCPCB surface. An illumination axis, corresponding to the z-axis Z as used herein and shown in FIG. 6C, is orthogonal to plane F that contains the LED array A. The z-axis extends from a midpoint origin within first LED array A.

Figure 7:
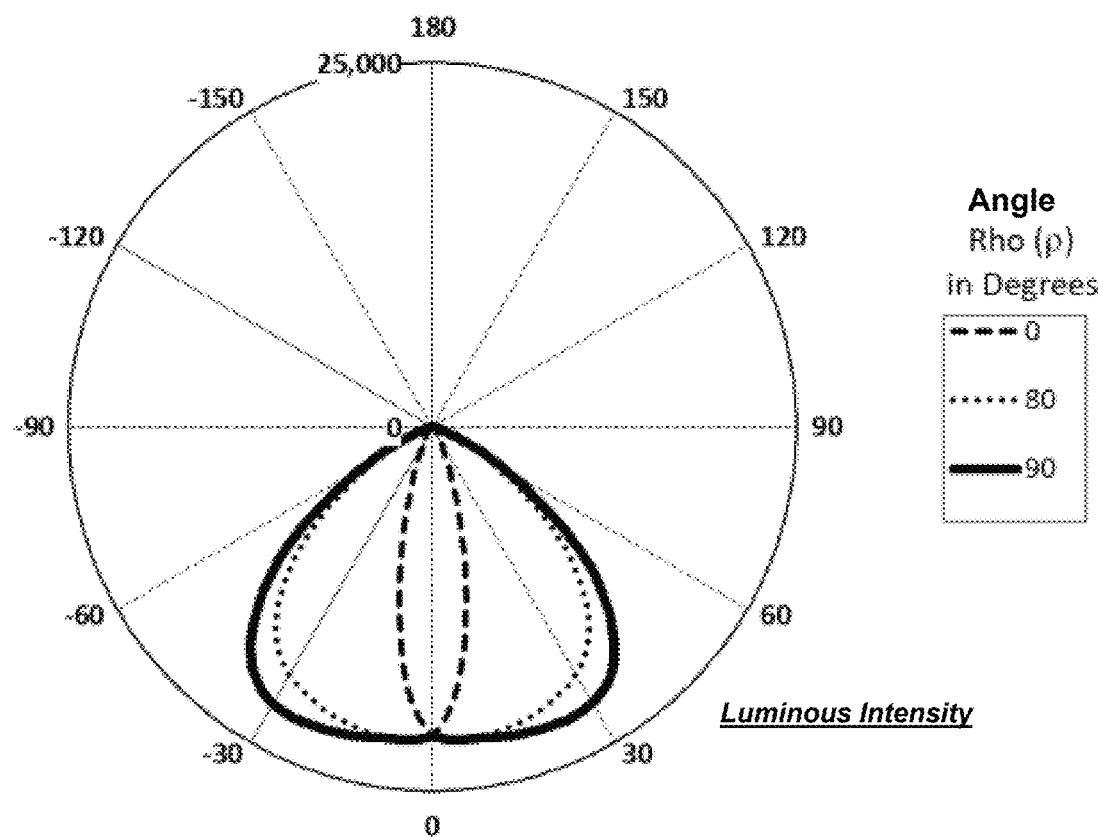
FIG. 7 is a polar coordinate diagram that shows characteristic light distribution available from an array of lenses coupled with a planar array of LED sources.

FIG. 7 shows, in polar coordinates, a characteristic first light distribution available from a luminaire that employs, as light sources, an array of first LED emitters coupled with first lenses 50, as described with reference to FIGS. 5A-6C. Illumination angles are with reference to the vertical or z-axis, as defined and used herein. The light distribution diagram of FIG. 7 shows, in different line treatments, the respective first light distribution along the direction of plane P0 (at angle ρ=) 0° (inner, heavy dashed line), in the direction of plane P90 (at angle ρ=) 90° (outer, thick continuous line), and along the intermediate direction of offset or skew plane $P_{offset}$ (at angle ρ=80° or other angle ρ between 0 and 90 degrees) (thin dotted line).

Interpreting FIG. 7, illumination intended for cross-aisle lighting along the P0 plane (first vertical plane) shown in FIG. 4A is substantially symmetric, intensified over a relatively narrow range of angles from the axis, with the bulk of emitted light in the range between about +/−15 degrees, with FW 50% less or markedly less than about 30 degrees (absolute value). Illumination intended to extend along the aisle, along the P90 plane (second vertical plane), has a broad oval distribution over the range of about +/−45 degrees, with FW 50% values that can exceed 90 degrees or higher (in absolute value). Illumination energy measured along the direction of the skew $P_{offset}$ plane (shown for the example wherein p=80 degrees) lies between the light measured for the P0 and P90 planes, with FW 50% as well as other FW percentage (FW %) values that lie between those measured along planes P0 and P90.

As shown in FIG. 7, and as can be expected, first luminous intensity of the light distribution along the skew plane $P_{offset}$ is below the intensity along the P90 plane, and exceeds the intensity along the P0 plane. Thus, all values of the measured $P_{offset}$ luminous intensity distribution substantially lie between values for luminous intensity distributions exhibited for P0 and P90 planes, respectively, for all angles theta (θ). The narrowest first luminous intensity distribution is with respect to plane P0, with light through lens 50 in the cross-wise orientation shown in FIG. 5B. While there is some useful conditioning of light distribution for aisle/corridor applications, the performance of lighting apparatus 60 as shown in FIG. 7 is still unsatisfactory along plane $P_{offset}$ at high elevation angles θ, providing little or no relief for correcting the deficiencies that result in dark spots of FIG. 2, shown as light-deprived area 16.

The Applicant provides a solution for compensating dark regions at elevated angles between light sources, improving the uniformity ratio Go of illumination by adding a second optic and corresponding secondary LED sources, wherein the additional second optic can be mounted on the same plane or mounted on a separate plane from the planar LED array.

Figure 8A:
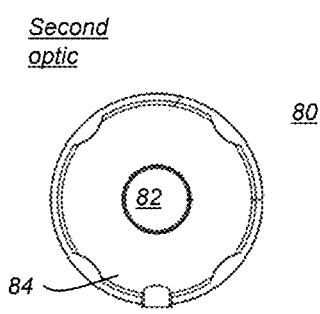
FIGS. 8A-8D show configuration and function for a directional illumination source that can be used to address the need for illumination along an offset or skew plane.
Figure 8B:
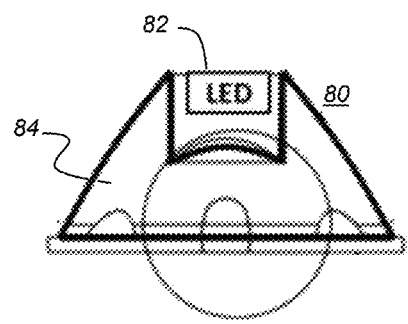
Figure 8C:
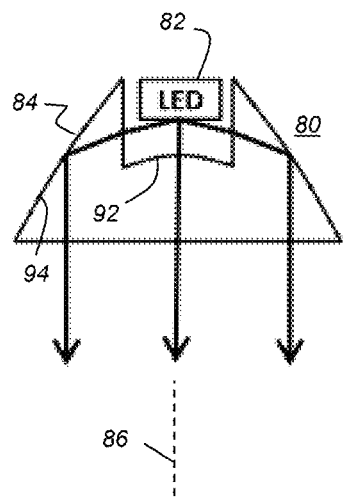
Figure 8D:
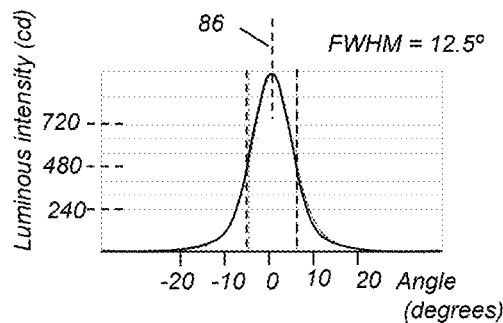

According to an embodiment of the present disclosure, one or more directional illumination sources forming a second light distribution can be employed to complement the function of the first LED 62 array and first lenses 50 for aisle lighting applications. FIGS. 8A-8D show configuration details and function for a directional illumination source 80 according to an embodiment of the present disclosure, providing a type of light source that can be used to address the need for additional illumination along the skew or offset or $P_{offset}$ plane. Directional illumination source 80 has an emissive second LED 82 housed within or otherwise paired with a TIR (Total Internal Reflection) second optic 84 that has a combination of reflective surface 94 or refractive surface 92. The second optic can optionally collimate the LED light along a central axis 86 as shown in FIG. 8C and help to provide a narrow intensity characteristic, as shown in the exemplary intensity vs. angle diagram plotted in FIG. 8D. The narrow intensity characteristic light distribution of directional illumination source 80 can be centered along a second optical illumination axis 86, typically oblique at angle θ to the central or first illumination axis (z-axis) and aimed towards light-deprived area 16 shown in FIG. 2. According to an embodiment of the present disclosure, the second optical illumination axis 86 extends along offset plane $P_{offset}$, as shown in FIGS. 3A-3D.

FIGS. 9A through 9D show embodiments of a lighting apparatus 20 that employs both a first illumination source array A that comprises the first LED and first lens 50 arrays described previously with reference to FIGS. 5A-6C and a plurality of directional illumination sources 80 (second illumination source) described with reference to FIGS. 8A-8D. In the FIG. 9A example, directional illumination sources 80 (second illumination source) can be mounted on sides 76 of a lighting apparatus 20 enclosure 70, wherein the enclosure sides 76 are parallel to the x-z plane and perpendicular to the x-y plane. The first illumination source array A produces a first optical distribution, the second illumination source 80 provides a second optical distribution. The combined first and second optical distributions form a total optical distribution. One embodiment of the total distribution is subsequently described with reference to FIGS. 13A, 13B, 14A-14F, and 16.

Figure 9A:
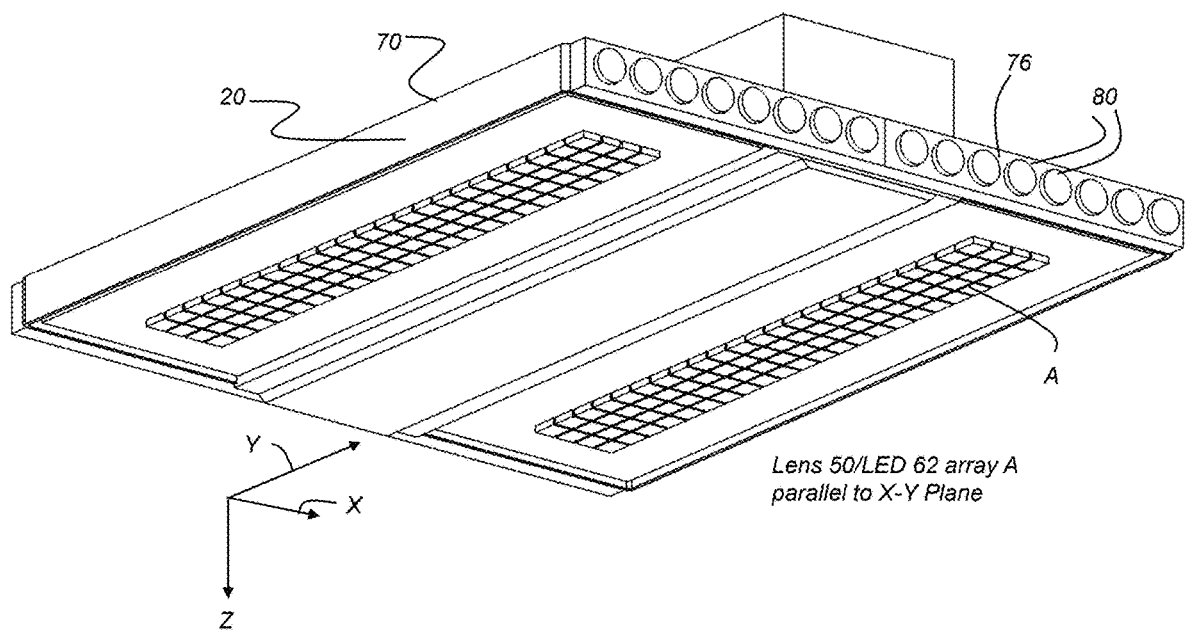
FIG. 9A is a perspective view showing an illumination apparatus for aisle lighting using additional illumination sources.
Figure 9B:
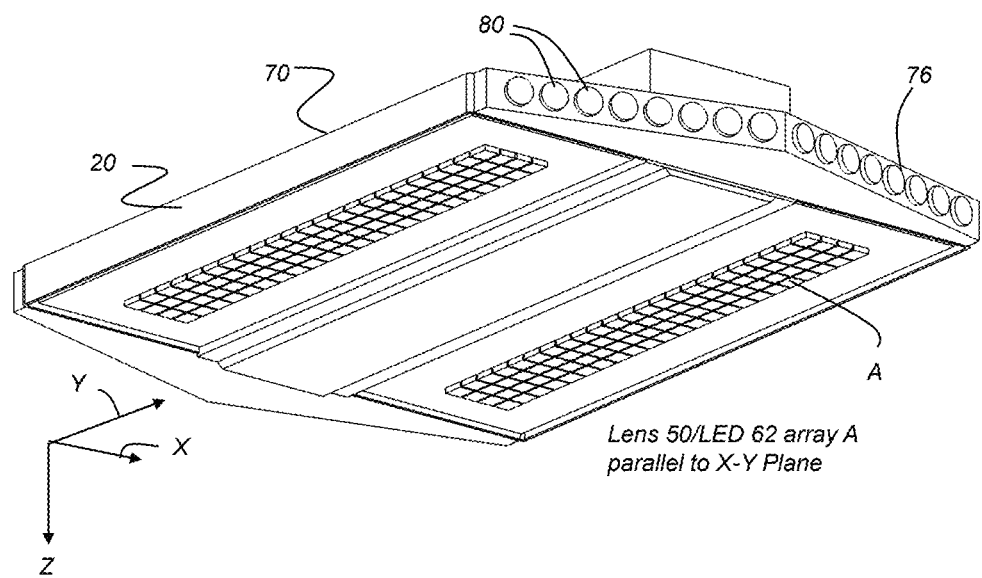
FIG. 9B is a perspective view showing an alternate illumination apparatus for aisle lighting, using additional illumination sources according to an alternate embodiment.
Figure 9C:
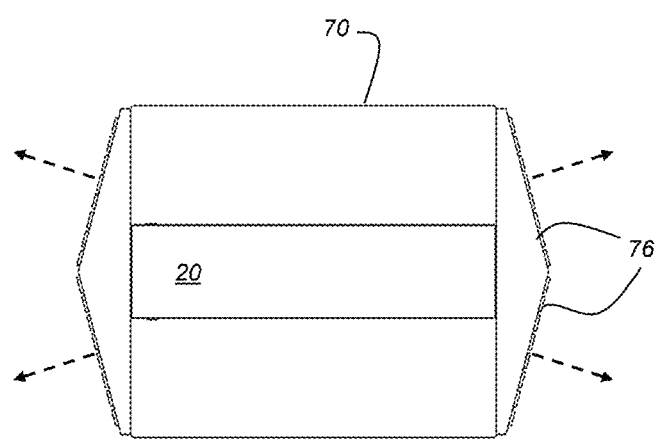
FIG. 9C is a top view that shows the oblique plane arrangement of FIGS. 9B and 9D.
Figure 9D:
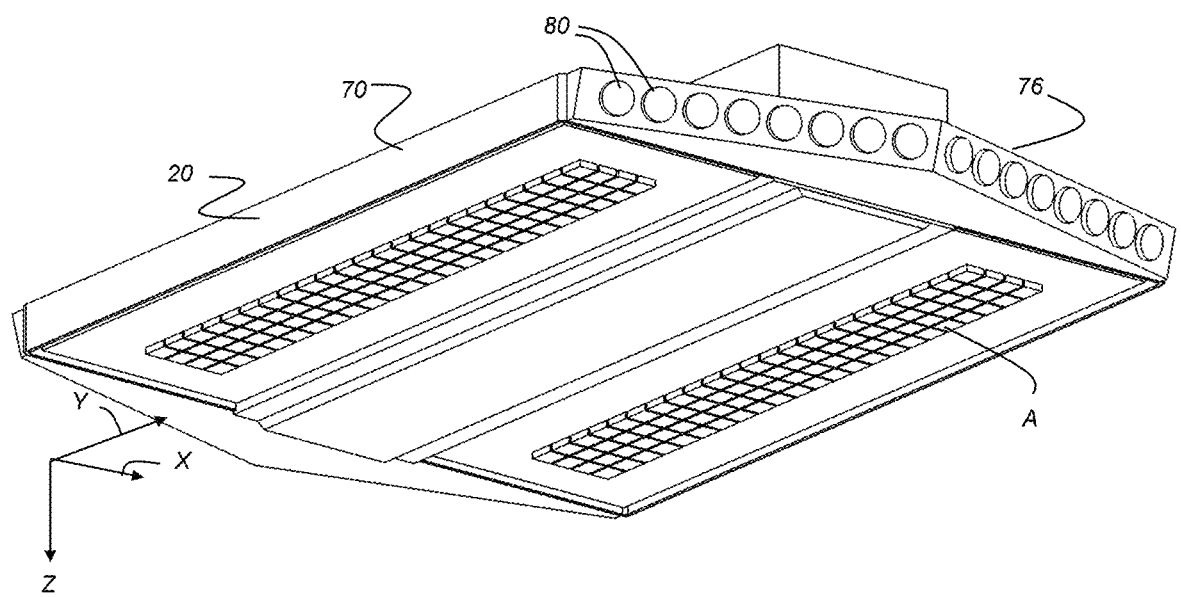
FIG. 9D is a perspective view that shows side planes that can mount directional illumination sources tilted slightly downward.

In FIG. 9B, directional illumination sources 80 can be mounted on sides 76 of enclosure 70 that extend from lighting apparatus 20 at angles not parallel to the x-z plane but still perpendicular to the x-y plane; the side planes may be orthogonal to the offset or skew plane $P_{offset}$. FIG. 9C is a top view that shows the oblique plane arrangement of sides 76 of the enclosures 70 shown in FIGS. 9B and 9D, with dashed lines indicating direction of emitted light as viewed from the top or bottom. FIG. 9D shows planar sides 76 oblique to the x-y plane that can thus mount directional illumination sources 80 to be tilted slightly downward from enclosure 76.

Among alternative embodiments that can be made to support skew angle illumination in order to supply light to the light-deprived area 16 shown in FIG. 2 are optics that can provide broader angular distribution and that can be mounted on the same plane as the first LED array A and collectively or independently rotated, lying along a plane parallel to the x-y plane on the illumination apparatus. Rotation can be about an axis orthogonal to the plane of the LED array, for example. Angular adjustment can be used to achieve the illumination characteristic at angle $ρ_{off}$ (second light distribution) shown in FIG. 10A.

Figure 10A:
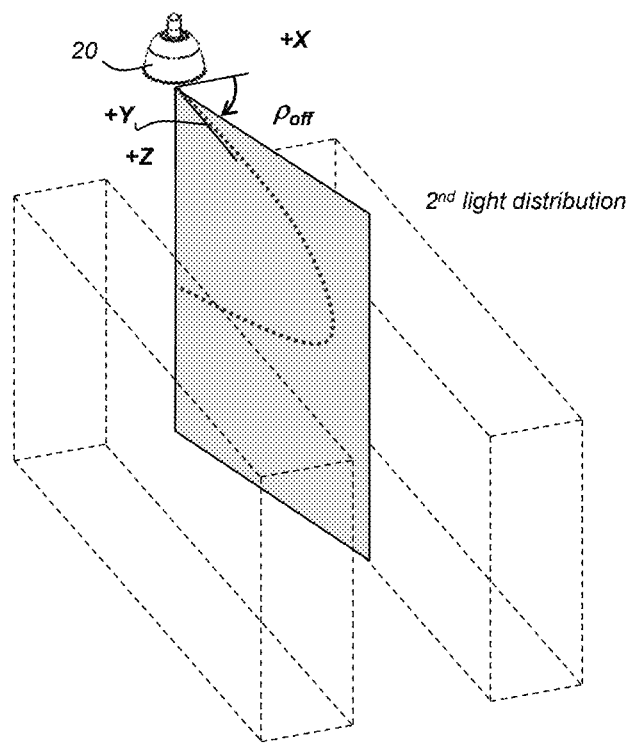
FIG. 10A is a schematic diagram that shows an illumination characteristic for an offset plan at the offset angle according to an embodiment of the present disclosure.
Figure 10B:
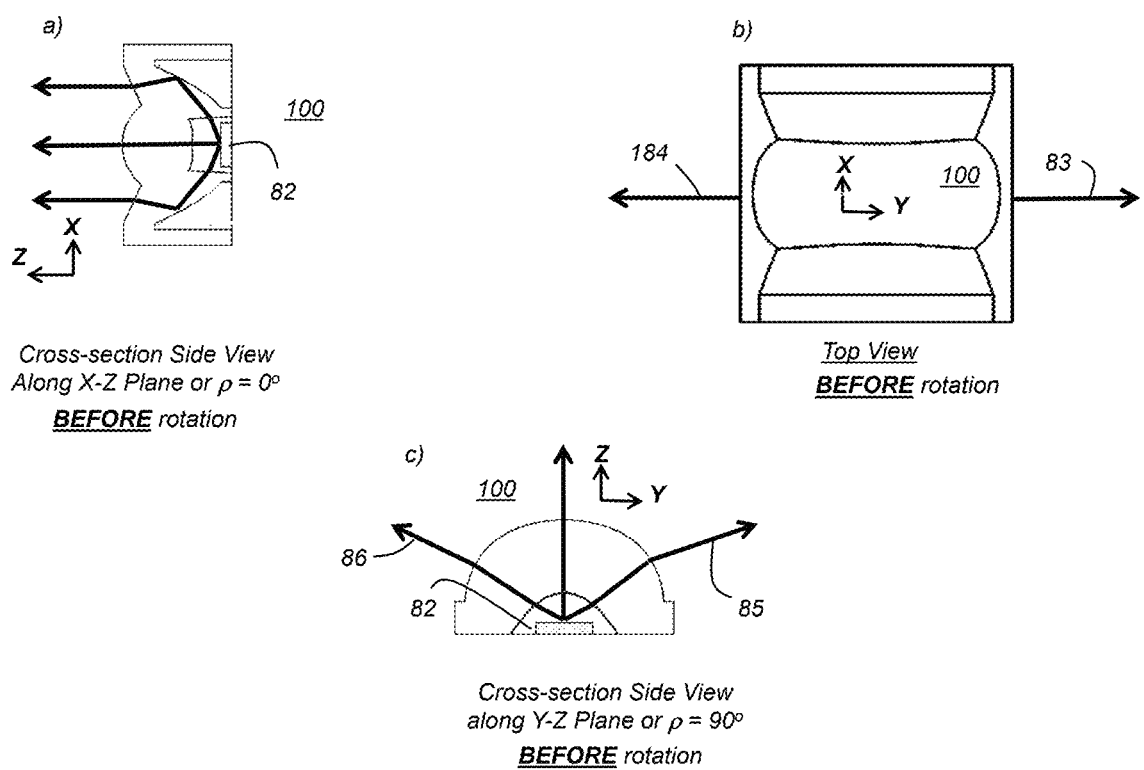
FIG. 10B shows side and top views of an offset illumination source according to an alternate embodiment of the present disclosure.

FIG. 10B shows cross-sectional side views at a) and c) and a top view at b) of an alternate side illumination source or second illumination source 100 to form the second optical distribution or skew distribution before rotation, according to an embodiment of the present disclosure. In the direction along the P0 plane, light distribution is narrow; for example, full width FW at 50% for this distribution can be less than 30 degrees, less than 20 degrees, less than 15 degrees, or less than 10 degrees. In the orthogonal direction along the P90 plane, light distribution is wide, for example, its FW at 50% can be greater than 100 degrees, greater than 110 degrees, greater than 120 degrees, or greater than 130 degrees, for example. This second optical distribution is symmetrical about the z axis. The high angle portion of the second optical distribution is represented by high angular rays 85 in one orientation shown at FIG. 10B part c) and it mirrors the image ray on axis 86. Rays 184 and 83 are shown in the top view at FIG. 10B part b).

Figure 10C:
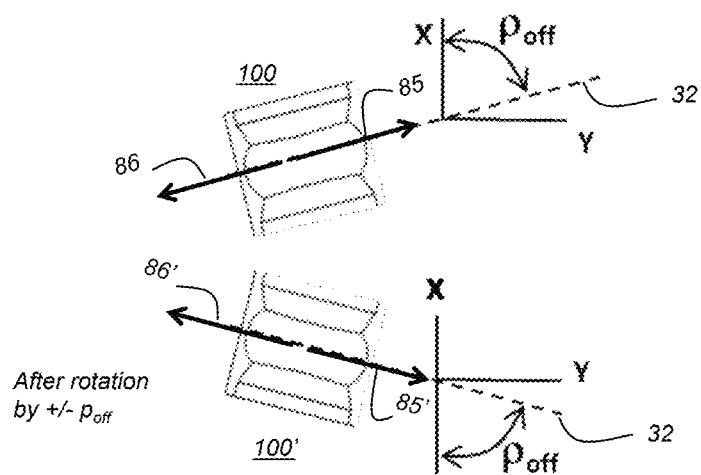
FIG. 10C is a schematic view that shows two offset illumination sources rotated to the offset angle to direct light at an offset angular position.

The second optical distribution from the skew or second illumination source 100 can be configured by rotating, about an axis parallel to the optical axis (z-axis) of the first illumination source LED 62 array A, to direct light in an angular direction. The overhead view of FIG. 10C shows two directional illumination sources 100 and 100' rotated to direct light at the $+\rho_{off}$ and $-\rho_{off}$ angular position. Second illumination source 100 with high angular optical distribution portions as represented by rays 85 and 86 can illuminate a $1^{st}$ and 2nd light deprived zone on either side of the aisle or rack, as previously described with reference to FIG. 2. Second illumination source 100' with high angular optical distribution portions as represented by rays 85' and 86' can illuminate a $3^{rd}$ and $4^{th}$ light deprived zone on either side of the aisle or rack. Each secondary illumination source 100 or 100' can therefore illuminate two light deprived zones, on either side of the aisle for a total of four light deprived zones in the directions as represented by rays 85, 86, 85', 86' corresponding to angle θ in FIGS. 3C and 3D, for aisle illumination of the light deprived zone 16 previously shown in FIG. 2.

Line 32 represents a central direction of light along the $P_{offset}$ plane for the second light distribution. Along the $P_{offset}$ plane, the directed light can range between an elevation angle that is nearly perpendicular to the first optical or first illumination axis (z-axis) and an elevation angle that is diverted almost 60 degrees from the optical axis origin at the illumination source.

Figure 10D:
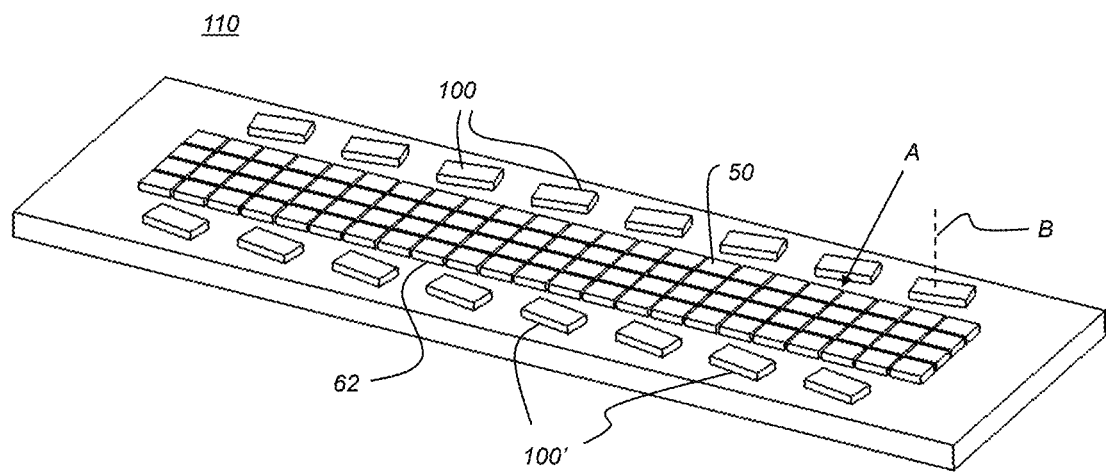
FIG. 10D is a perspective view showing a lighting apparatus according to an alternate embodiment of the present disclosure.
Figure 10E:
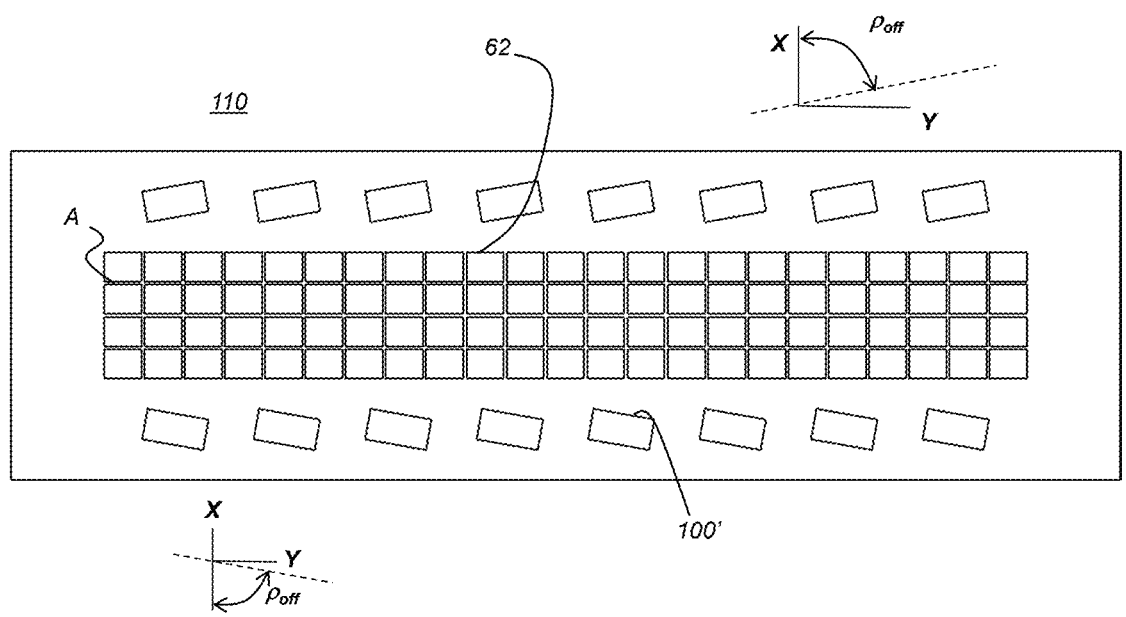
FIG. 10E is a plan view showing the lighting apparatus of FIG. 10D.
Figure 10F:
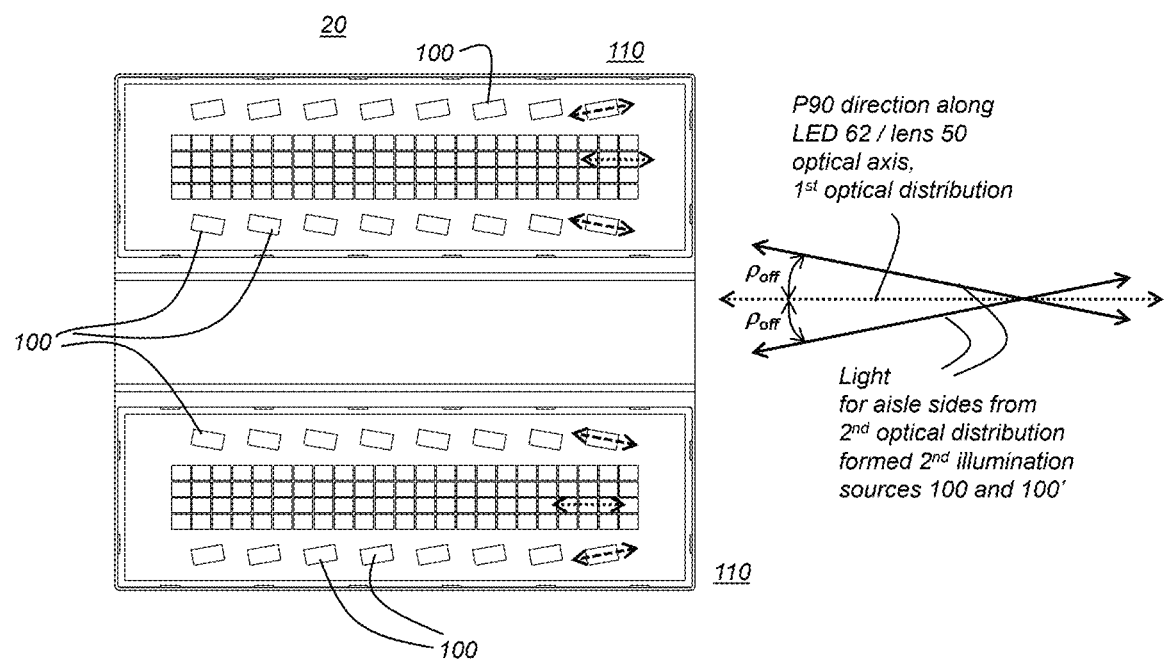
FIG. 10F shows light directions for illumination according to an embodiment of the present disclosure.

FIG. 10D is a perspective view that shows a lighting apparatus 110 that has first illumination source array A, with each first LED 62 in the array paired with a corresponding first lens 50 provided in a first lens array. Along edges of the circuit board or other planar surface of lighting apparatus 110, a number of discrete two-directional second illumination sources 100 and 100' can be rotated about axes B for directing light at appropriate angles for skew plane illumination, at the desired $+/-\rho_{off}$ angular positions, providing light on each side of an aisle or corridor, as shown in FIGS. 10E and 10F. FIG. 10F shows overall lighting apparatus 20 having two lighting apparatus 110, displaced from each other and rotated 180 degrees from each other. The first illumination source array produces a first optical distribution, the second illumination source 100 produces a second optical distribution. Together the first and second optical distributions combine to form a total optical distribution. Embodiments of this total distribution are subsequently described with reference to FIGS. 13A-13B, 14A-14F, and 15.

Figure 11A:
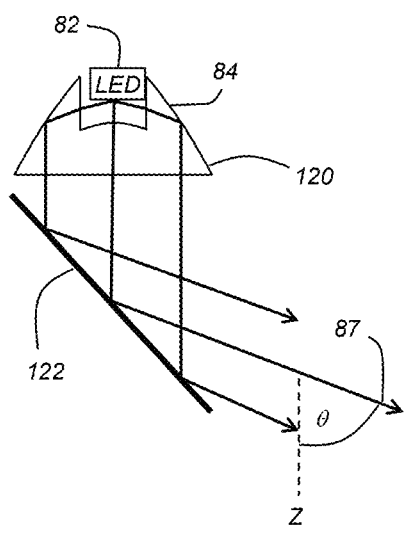
FIGS. 11A, 11B, and 11C are schematic diagrams that show a directional illumination source according to an alternate embodiment of the present disclosure.
Figure 11B:
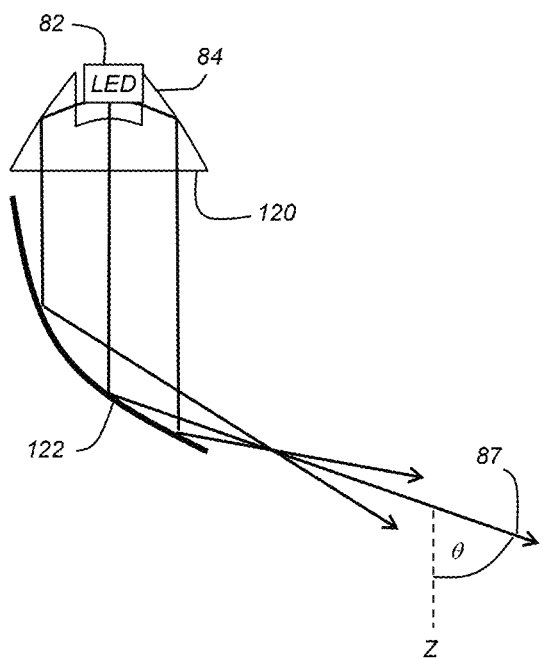
Figure 11C:
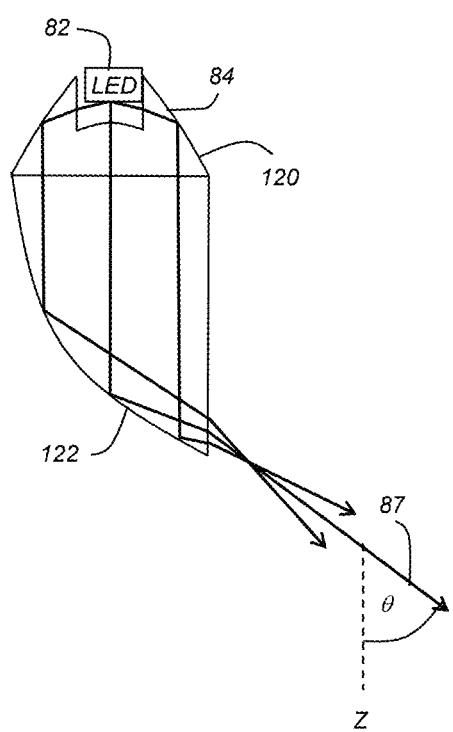

FIGS. 11A, 11B, and 11C are schematic diagrams that show a directional illumination source 120 with optic for forming the second optical distribution according to an alternate embodiment of the present disclosure. A reflective surface 122, which can be flat as shown in FIG. 11A or curved as shown in FIGS. 11B and 11C, redirects LED emitter 82 light, having a relatively narrow distribution, and LED light from second optic 84 to a suitable elevation angle, corresponding to angle θ in FIGS. 3C and 3D, for aisle illumination. The reflector arrangement enables the second LED emitter 82 and second optic 84 to be mounted on the same or parallel plane as first LED 62 array, as described previously. Reflection can use total internal reflection (TIR) or coated surfaces, for example. Curvature can be used to help shape the optical distribution. The redirected light output from reflective surface 122 can be collimated, as shown in FIG. 11A, partially collimated, or un-collimated, as shown in FIGS. 11B and 11C. Second illumination source 120 is rotated similarly as the second illumination source 100 about the z-axis so that the second optical axis 87 aligns with the $P_{offset}$ plane. Unlike the optic 100 of FIGS. 10A-10B wherein the single optic illuminates in two directions along rays 85, 86, second illumination source 120 will illuminate in a single direction about the second optical axis 87 corresponding to angle θ in FIGS. 3C and 3D, for aisle illumination and directing light to the light-deprived zone 16 in FIG. 2. Thus is provided a dedicated illumination source 120 aligned and aimed to each light-deprived zone 16.

Figure 12C:
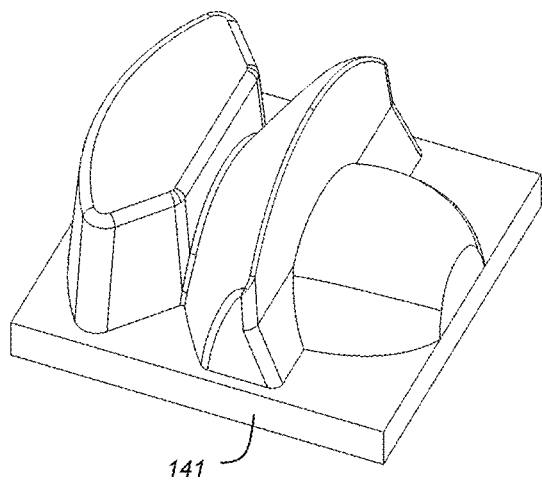
FIGS. 12C and 12D are perspective views that show side and top views, respectively, of alternate light-redirecting optics that can be mounted on the LED array plane.

FIGS. 12A, 12B, 12C, 12D, and 12E show various views of an alternative embodiment of the present disclosure showing second illumination source 140 using a second optic 141 and second LED 82 for forming the second optical distribution along plane $P_{offset}$. FIGS. 12A and 12B show side and top views, respectively, of the light-redirecting features of second optic 141 for second illumination source 140 that can be mounted on a plane parallel to the LED array plane.

Figure 12D:
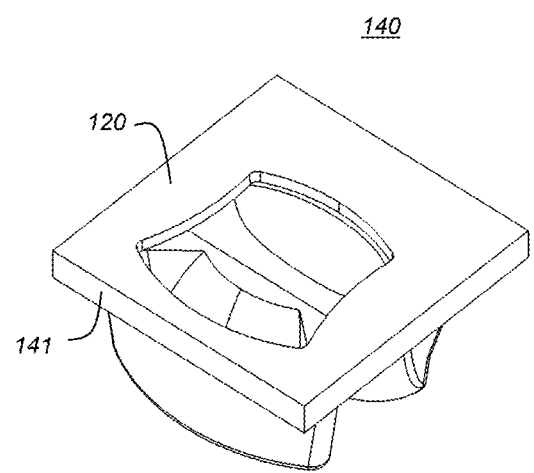

FIGS. 12C and 12D are perspective views that show side and top views, respectively, of alternate light-redirecting optic 141 that can be mounted on the LED array plane or on an associated parallel lens plane. As shown in the side view of FIG. 12E, directional second optic 141 is a lens with multiple sections for directionally conveying light from an energized second LED emitter 82, using both total internal reflection and TIR, and using refractive shaping of the incident light from second LED emitter 82.

Figure 12E:
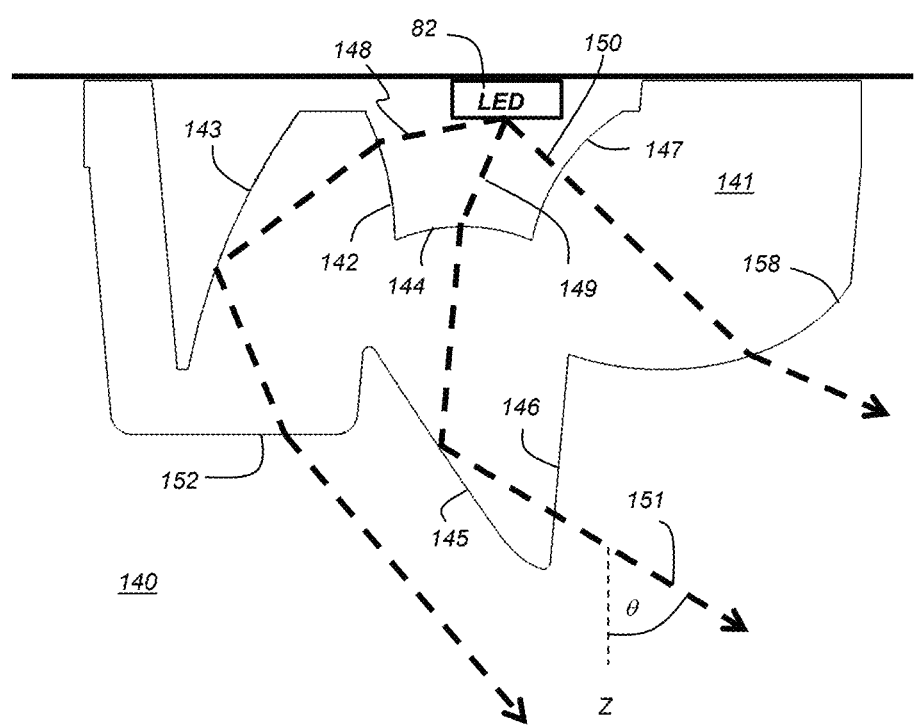
FIG. 12E is a side view schematic that shows light redirection from light-redirecting optics of FIGS. 12C and 12D.

FIG. 12E is a side view schematic that shows uncollimated light from second light source 82 redirected from light-redirecting optic 141, providing the second optical distribution along a second optical axis 151 that is at angle elevation θ from the first optical axis or z-axis and intended to be aligned along the $P_{offset}$ plane to illuminate the light deprived zone 16 of FIG. 2. Three exemplary light paths 148, 149, and 150 through a refractive lens that redirects light from second optic 141 are shown, in dashed lines and indicate how light emitted from second LED 82 can be redirected for providing illumination along the offset plane. Along first path 150, light from the second LED 82 is refracted at a first lens surface 147, conveyed through the lens, and refracted again at lens exit surface 158. Along second path 149 and third path 148, at different angles with respect to the plane of second LED 82, light is refracted at surfaces 144 and 142, then reflected from surfaces 145 and 143, then refracted again to exit at lens surfaces 146 and 152. Total internal reflection (TIR) can be used; alternately, one or both surfaces can be coated or otherwise treated to increase reflection of surfaces 143 and 145. The directional optic 141 is designed so that it can be mounted around the LED 82 and rotated together about an axis parallel to the z-axis to match the $P_{offset}$ plane. Similar to second illumination source 120 with its second optical distribution in a single direction about the second optical axis 87, second illumination source 140 also illuminates in a single direction about second optical axis 151. Therefore, second illumination sources 140 are needed to illuminate and align to each light-deprived zone.

Figure 12F:
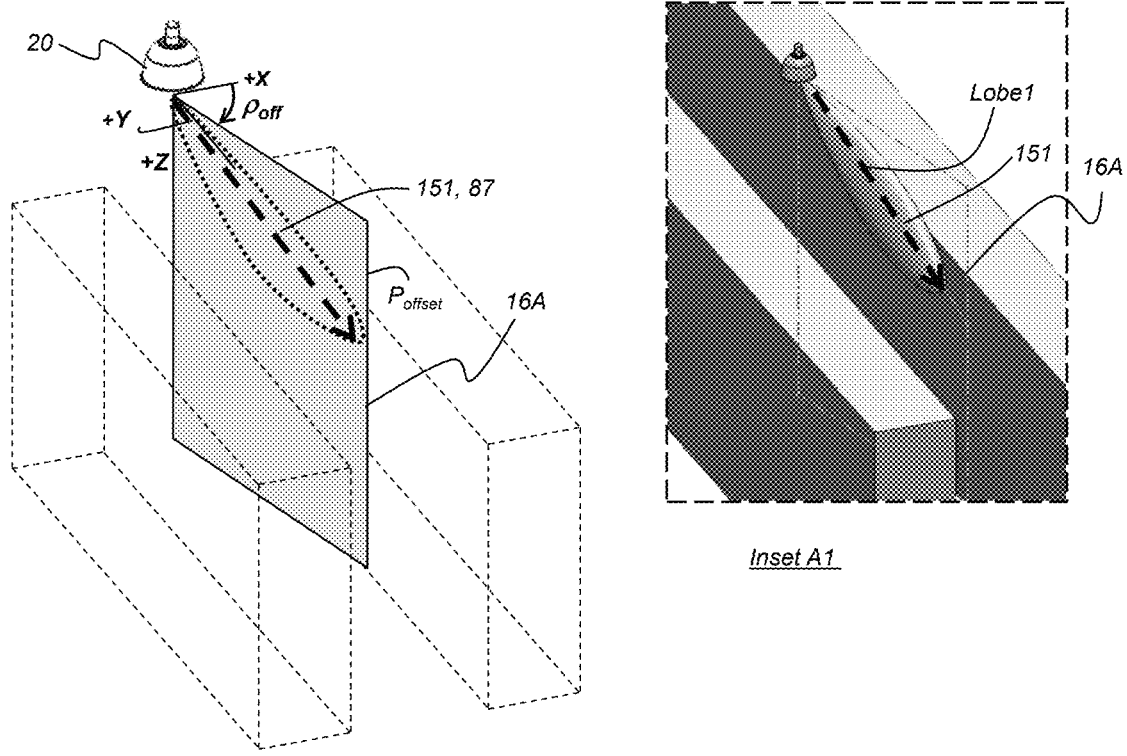
FIG. 12F is a schematic view that shows a portion of the light distribution along the offset plane using light redirecting optics according to an embodiment of the present disclosure.
Figure 12G:
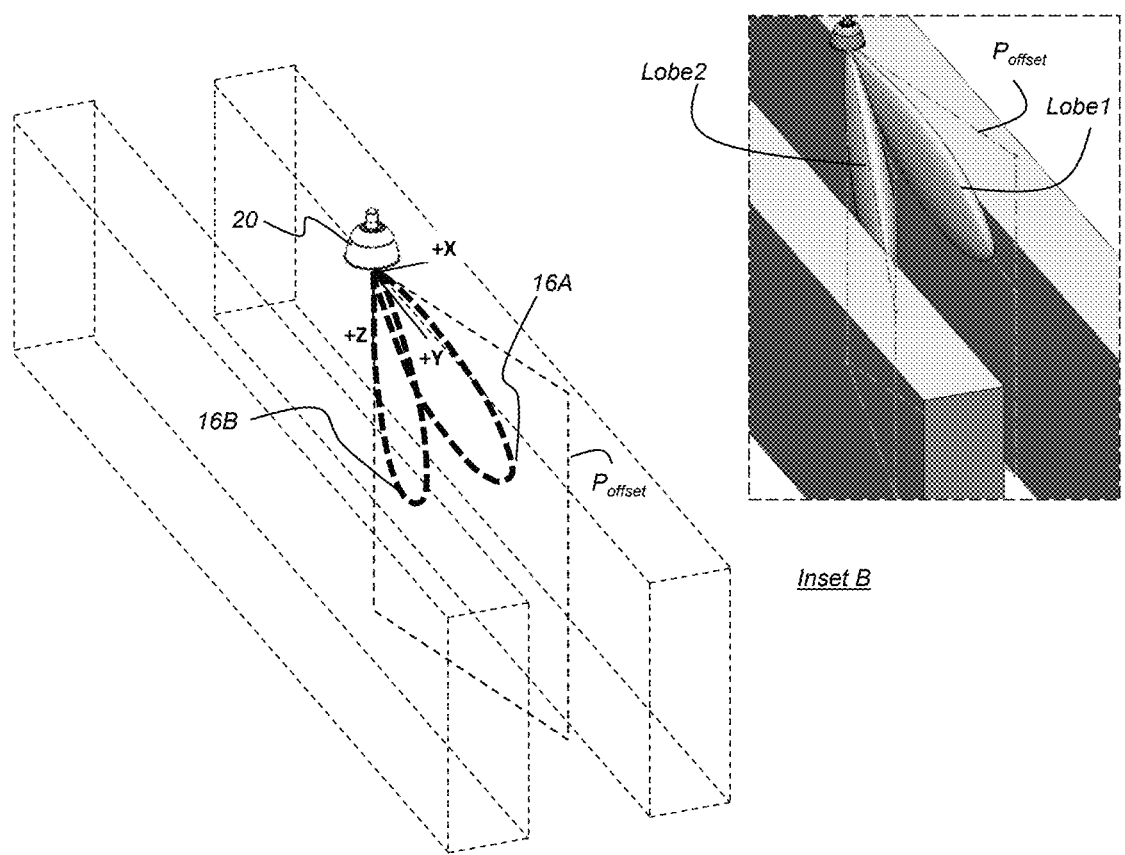
FIG. 12G is a schematic view that supplements FIG. 12F and shows an additional portion of the light distribution along the offset plane using light redirecting optics according to an embodiment of the present disclosure.
Figure 12H:
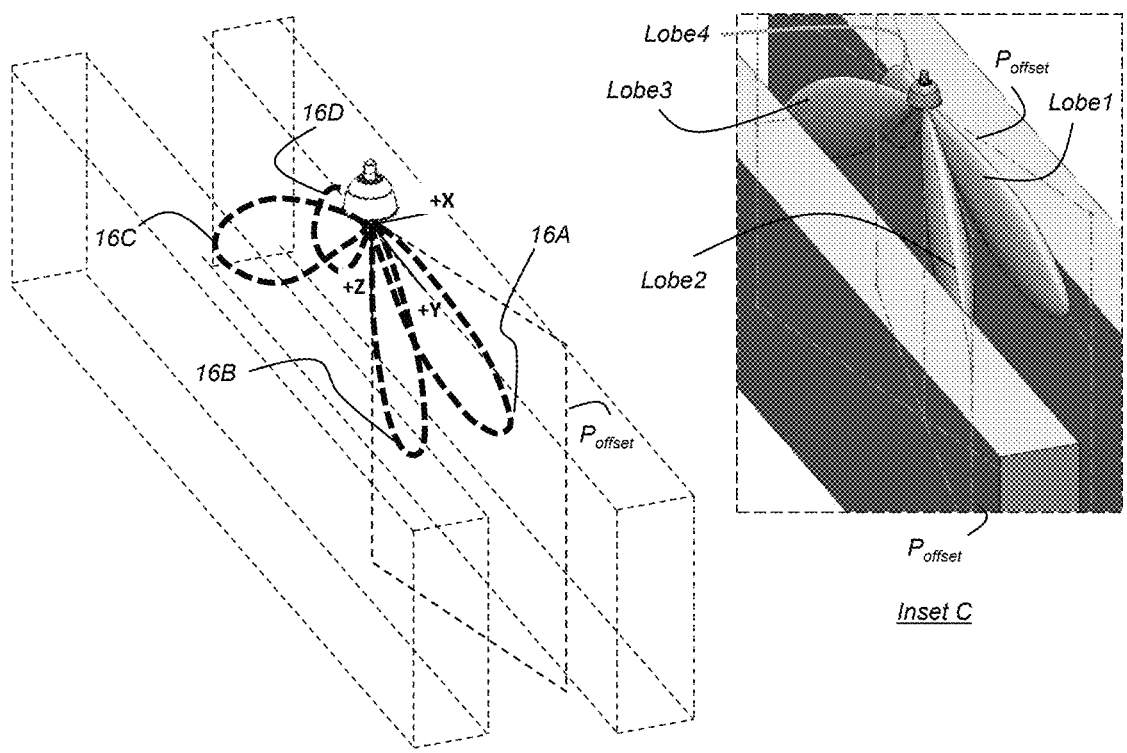
FIG. 12H is a schematic view that supplements FIGS. 12F and 12G and shows yet another additional portion of the light distribution along the offset plane using light redirecting optics according to an embodiment of the present disclosure.

FIGS. 12F through 12H are schematic views that show lobes indicative of light distribution along the offset plane $P_{offset}$ using second illumination source 120 of FIGS. 11A-11C; or using second illumination source 140 of FIGS. 12A, 12B, 12C, 12D, and 12E. FIG. 12F shows one of the lobes, labeled Lobe1 for representing light distribution that is along the second optical axis 87 or 151. Inset A1 in FIG. 12F shows the position of Lobe 1 along offset plane $P_{offset}$ directed to a first light-deprived area 16A. FIG. 12G shows, in Inset B, the relative position of a Lobe2 that is symmetric to Lobe 1 along the direction of plane P90 and the intent of Lobe2 is to direct illumination into a light-deprived area 16B. FIG. 12H shows, in an Inset C, additional lobes, Lobe3 and Lobe4, that show the light distribution to be symmetric to Lobes1 and 2, but extending in the direction of the first vertical plane P0. The purpose of Lobes3 and 4 is to direct illumination into light-deprived zones 16C and 16D, respectively.

It should be noted that embodiments of the present disclosure can allow lighting apparatus 20 to provide light only at specific angles, so that only certain lobes can be observed. With reference to FIG. 12G, for example, lighting apparatus 20 can be configured for providing light along a portion of lobes, such as only along Lobe1 and Lobe2 when used near an end of an aisle or corridor. This arrangement can be accomplished by fabricating lighting apparatus 20 so that specific light sources can be removed or selectively disabled, for example. Thus, with respect to the apparatus arrangement in FIG. 10E, for example, one or more of directional light sources 100 can be selectively enabled or redirected for providing a lobe or lobes in selected directions.

Figure 12I:
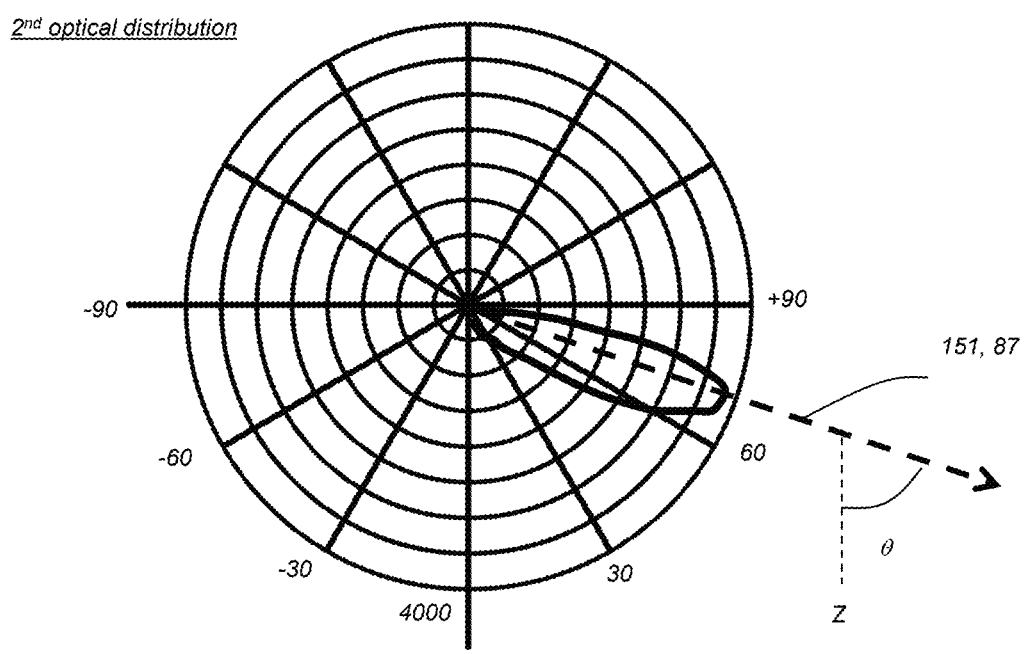
FIG. 12I is a polar coordinate diagram that shows the light distribution relative to the offset plane obtained using embodiments of the present disclosure.

FIG. 12I is a polar coordinate diagram that shows the second optical distribution of luminous intensity relative to the offset plane $P_{offset}$ that can be obtained from second illumination source 120 or 140 using embodiments of the present disclosure. Second illumination source 120 140 is rotated parallel to the z-axis in order to achieve the indicated light distribution along the offset plane, as shown in FIGS. 12D and 12I. A single lobe representing the second optical distribution, Lobe 1, is along the second optical axis 151 or 87.

Figure 12J:
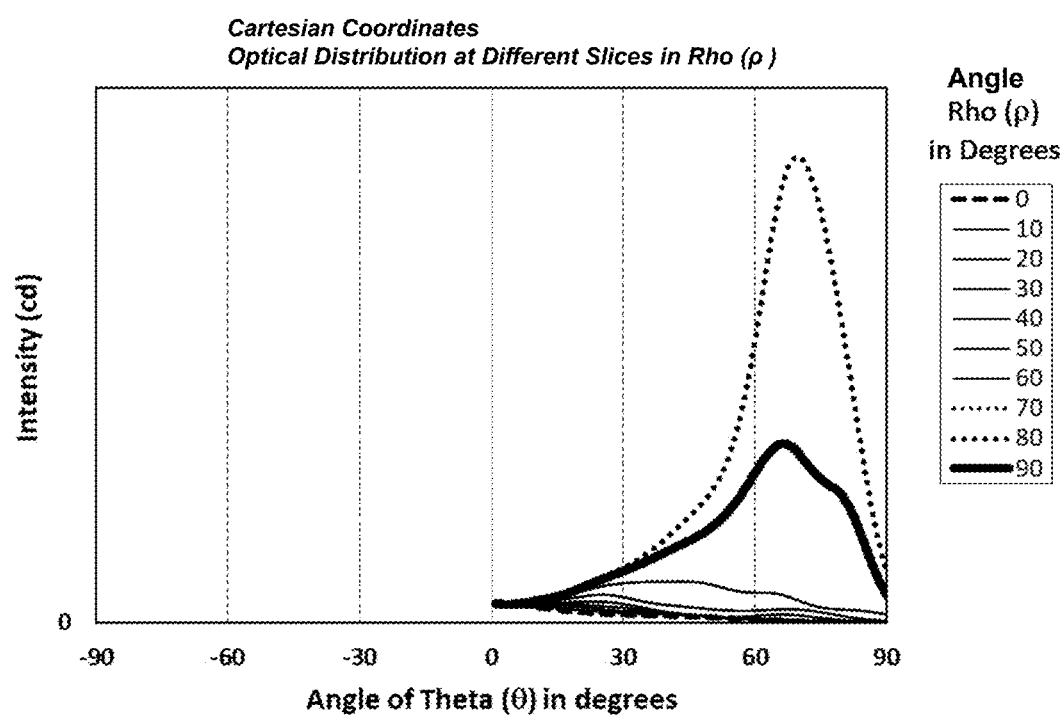
FIG. 12J shows, using Cartesian coordinates, optical distribution achieved by embodiments of the present invention, relative to the offset angle.

FIG. 12J shows, considering intensity along Cartesian coordinates, the resulting second optical distribution of luminous intensity achieved by embodiments of the present disclosure, with optics rotated to the offset angle.

Figure 12K:
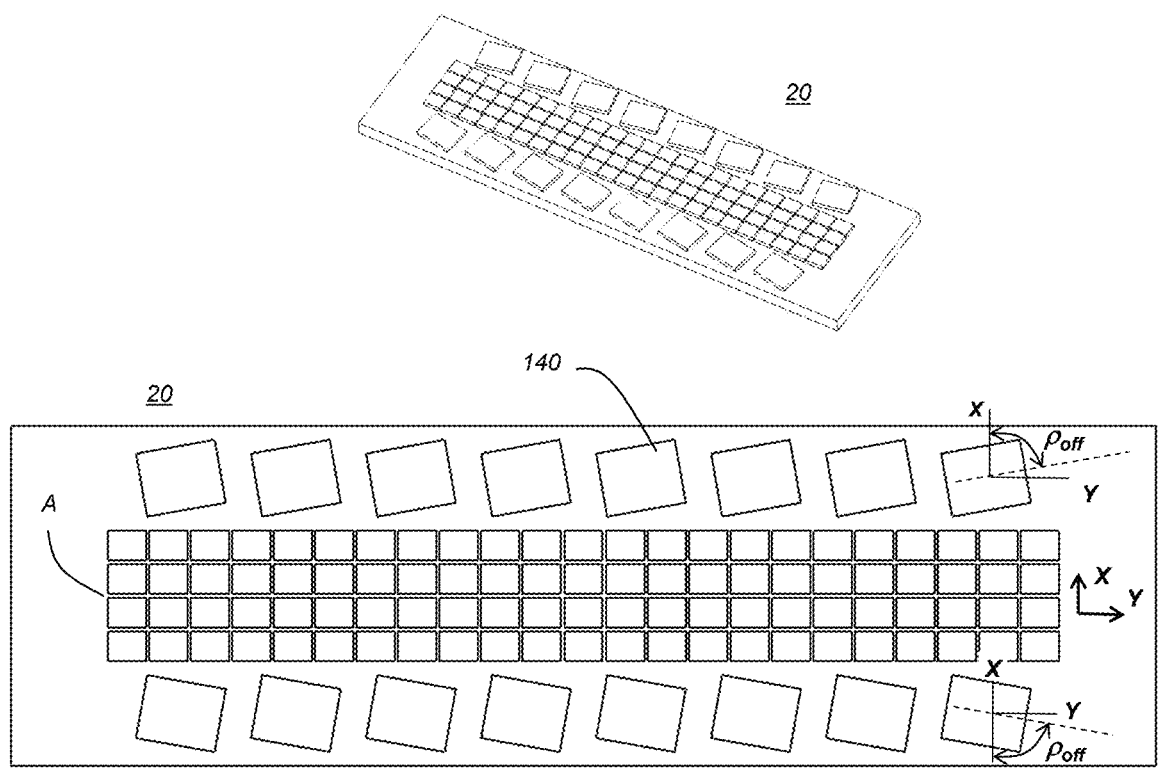
FIG. 12K shows, in perspective and plan views, an illumination apparatus having an LED array supplemented by rotated directional illumination sources, according to an embodiment of the present disclosure.

FIG. 12K shows, in perspective and plan views, an embodiment of lighting apparatus 20 having illumination source array A forming a first optical distribution as described with reference to FIGS. 5A-5D, 6A, 6B, and 7. This is supplemented by second illumination source 140 as described with reference to FIGS. 12A-12J or, alternatively, second illumination source 120 as described with reference to FIGS. 11A-11C, according to an embodiment of the present disclosure. First illumination source array A produces the first optical distribution, second illumination source 140 produces the second optical distribution. Together, the first and second optical distributions combine to form a total optical distribution. One embodiment of this total distribution is later described in FIGS. 13A-13B, 14A-14F, and FIG. 15.

Figure 12L:
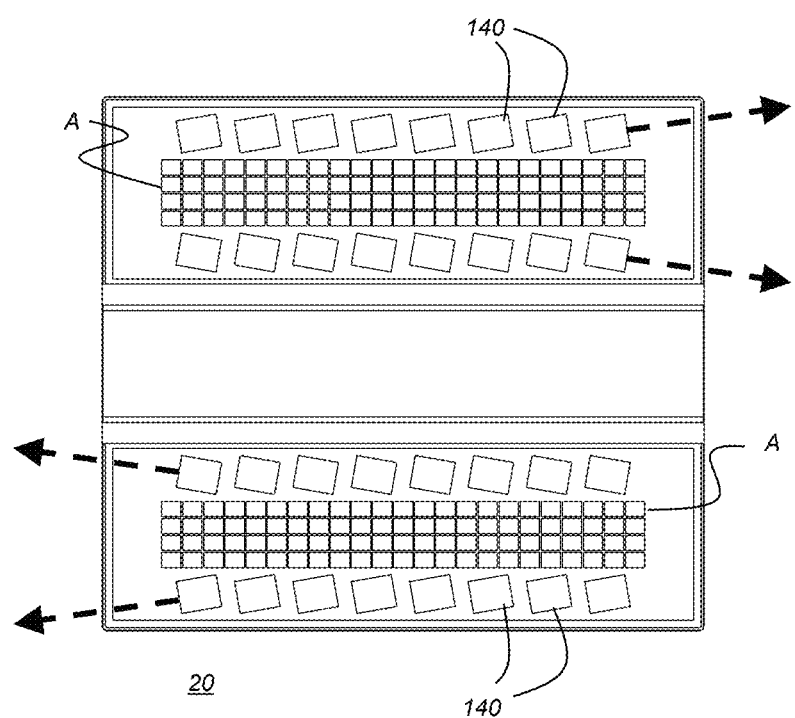
FIGS. 12L and 12M show light redirection that can be applied using directional illumination sources.
Figure 12M:
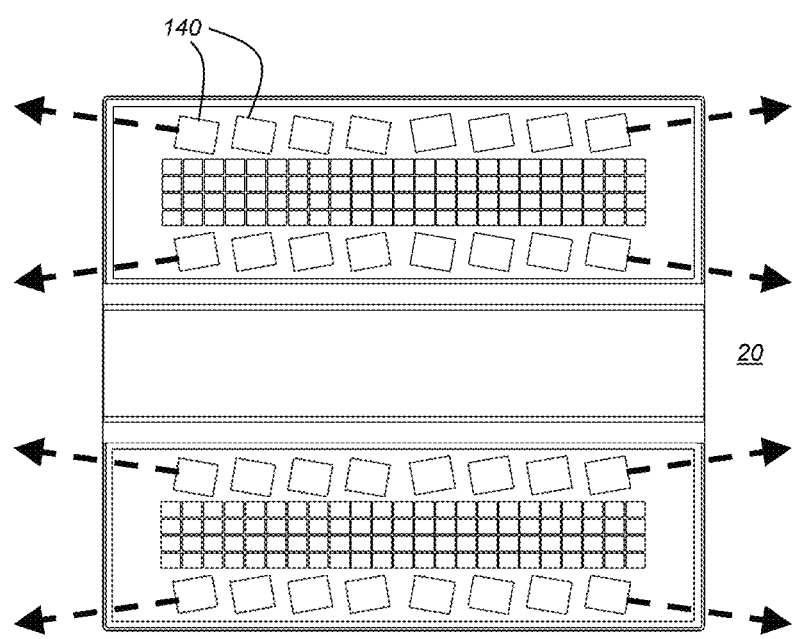

FIGS. 12L and 12M show light redirection that can be applied using various arrangements of second directional illumination sources 140, for example. FIG. 12L shows wherein directional second illumination sources 140 are aligned in rows, each row of sources 140 configured to direct light in the same direction. Lobes for one side are generated from the upper bank of illumination source 140; lobes for the other side are generated from the lower bank of illumination source 140. FIG. 12M shows a configuration with second illumination sources 140 directed toward each side of lighting apparatus 20 for increasing illumination to dark side wall areas on both sides of an aisle or corridor.

Figure 13A:
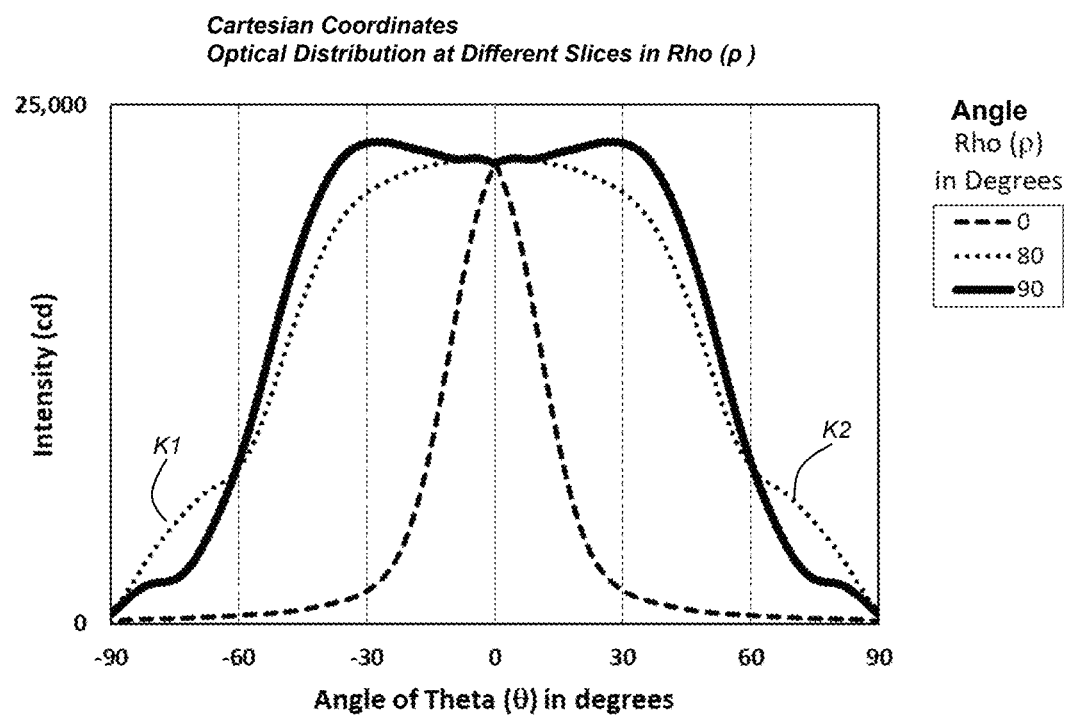
FIG. 13A is a Cartesian coordinate graph that shows the total luminous intensity at angles of interest.

The graph of FIG. 13A plots the total optical distribution of intensity versus elevation angle θ (FIGS. 3C, 3D) along each of the three planes of interest: (i) along cross-aisle plane P0 (heavy dashed line), the first vertical plane; (ii) along orthogonal plane P90 (heavy line), the second vertical plane; and (iii) along skew or offset plane $P_{offset}$ (dotted line). In FIG. 13A, a single offset plane at Rho or ρ=80 degrees, also called the P80 plane, is shown with a fine dotted line. The total optical distribution comprises the light distribution along the first and second vertical planes, P0 and P90, respectively. The total optical distribution, considered in cross-section with respect to the first vertical plane P0, is symmetric. Similarly, the first optical distribution, considered in cross-section with respect to the second vertical plane P90, is symmetric.

Still referring to FIG. 13A, of particular interest with respect to the Applicant solution for corridor illumination is the added intensity component for light that forms a second optical distribution of luminous intensity, symmetric about and measured along the offset plane that is coincident to the first optical axis and is skewed from the first vertical plane P0 by an angle ρ that is between 60 and 88 degrees. In FIG. 13A, the added intensity component of the second optical distribution is highlighted at graph positions labeled K1 and K2. As shown at position K2, for elevation angles θ between 60 and 90 degrees (and, correspondingly at K1, between negative 60 and negative 90 degrees), the luminous intensity along the offset plane $P_{offset}$ exceeds the luminous intensity measured along the orthogonal P90 plane (indicated in a bold line in the FIG. 13A curve). This behavior is in contrast with conventional design approaches and single-lens designs as was shown previously in FIG. 7, wherein, as expected, luminous intensity along oblique plane $P_{offset}$ is below the intensity for the orthogonal plane P90 over the same angular range. For aisle illumination, curve positions marked K1 and K2 indicate increased light directed in the oblique plane $P_{offset}$ direction and at elevations above about 60 degrees from the z-axis reference that extends from the light source. This light energy is directed to provide illumination to area 16 shown schematically in FIG. 2.

The combined first optical distribution and second optical distribution form a total optical distribution that:
  (i) considered in cross-section with respect to the first vertical plane has a first cross-section luminous intensity distribution having a first width;
  (ii) considered in cross-section with respect to the second vertical plane has a second cross-section luminous intensity distribution having a second width that exceeds the first width;
  (iii) considered in cross-section with respect to the offset plane has an offset cross-section luminous intensity distribution having an offset width.

Figure 13B:
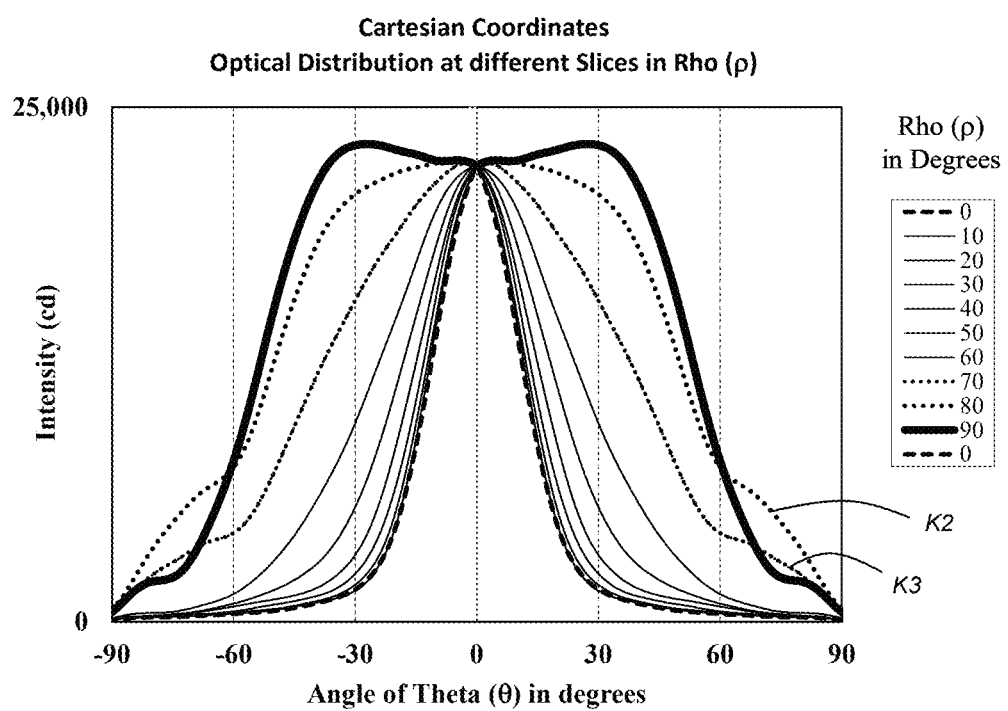
FIG. 13B shows a graph of total light distribution, relative to a Cartesian coordinate system, taken along different angles Rho (p) within the x-y plane, as shown in FIG. 10A and elsewhere.

FIG. 13B shows a graph of light distribution, relative to a Cartesian coordinate system, taken along different angles Rho (ρ), as shown in FIG. 10A and elsewhere. As shown at position K3, for values of ρ at 70 degrees, luminous intensity along the offset plane $P_{offset}$ has a wider distribution at high angles and exceeds the intensity along the P90 plane.

Figure 14A:
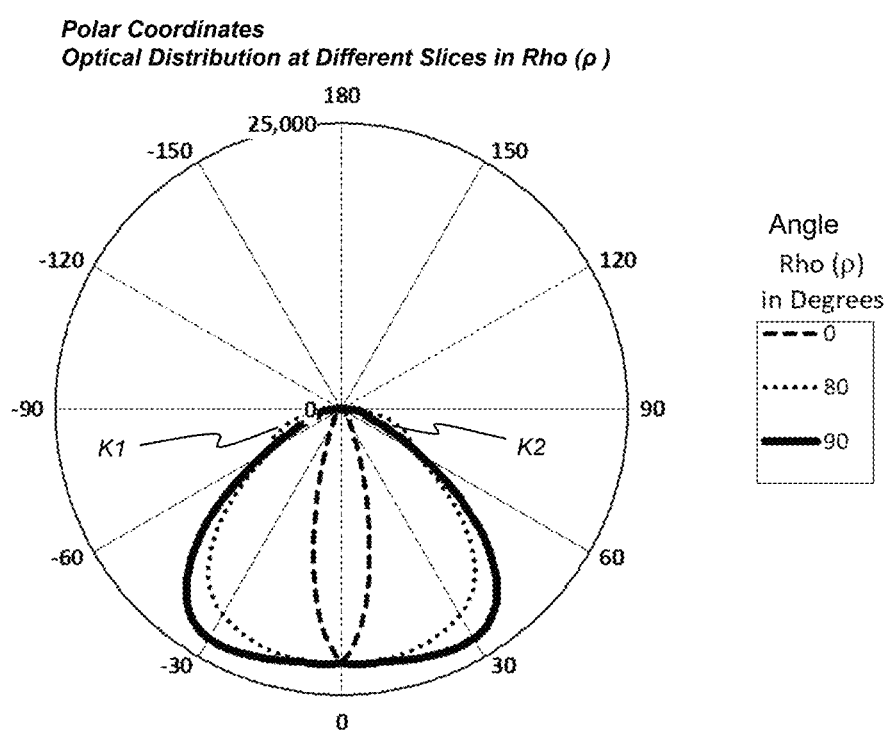
FIG. 14A is a polar coordinate graph that shows total luminous intensity at angles of interest.

FIG. 14A shows the luminous intensity corresponding to FIG. 13A in polar coordinates. Similar to FIG. 13A, there is a first vertical plane P0, Rho (ρ)=0 degrees plane, second vertical plane P90, Rho (ρ)=90 degrees plane, and offset plane $P_{offset}$, Rho (ρ)=80 degrees plane. Again, as highlighted on the graph at positions K1 and K2, for elevation angles θ between 60 and 90 degrees, luminous intensity is measured along the orthogonal second vertical plane P90. At elevation angles θ>60 degrees from the first optical axis (z-axis), luminous intensity along $P_{offset}$, Rho (ρ)=80 degrees plane exceeds the luminous intensity measured along the second vertical plane P90, Rho (ρ)=90 degrees plane.

Figure 14B:
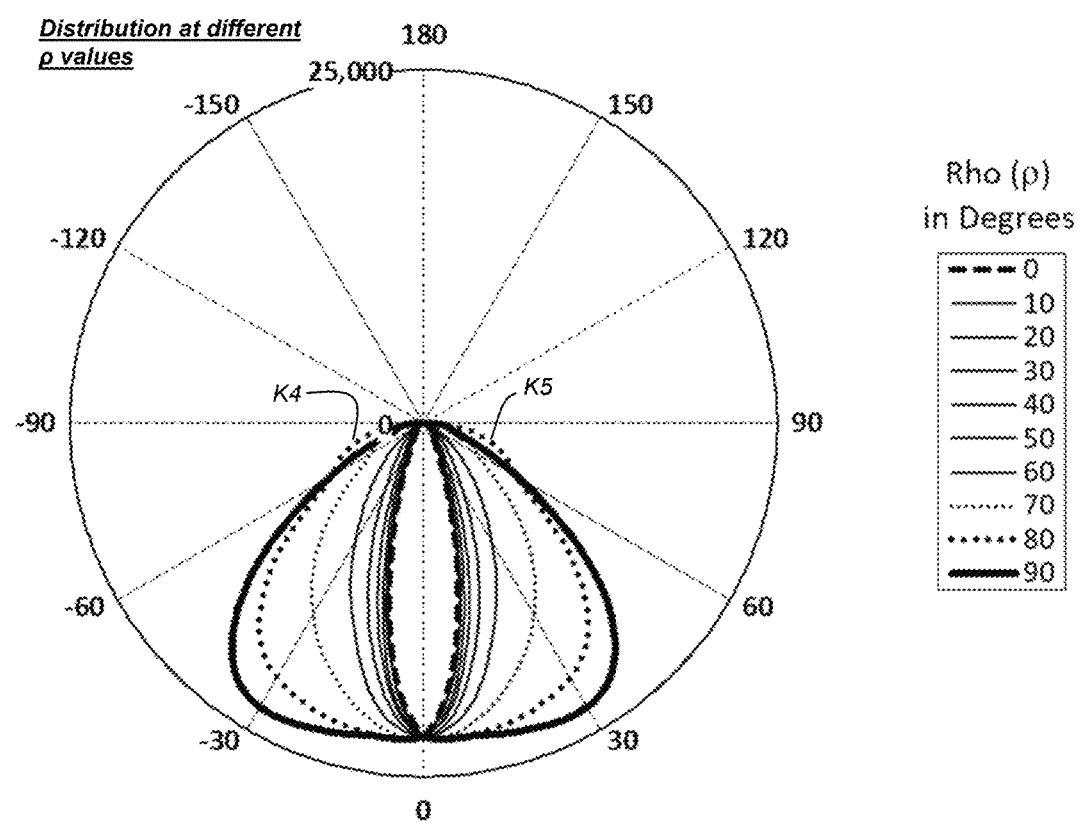
FIG. 14B shows, using polar coordinates, total light distribution achieved at different values of angle Rho (p) from within the x-y plane.

FIG. 14B, corresponding to FIG. 13B, shows, using polar coordinates, light distribution achieved at different values of angle Rho (ρ) from within the x-y plane. As shown at positions K4 and K5, distribution along p angle 80 exceeds that along second vertical plane P90 with the Applicant illumination apparatus.

Figure 14C:
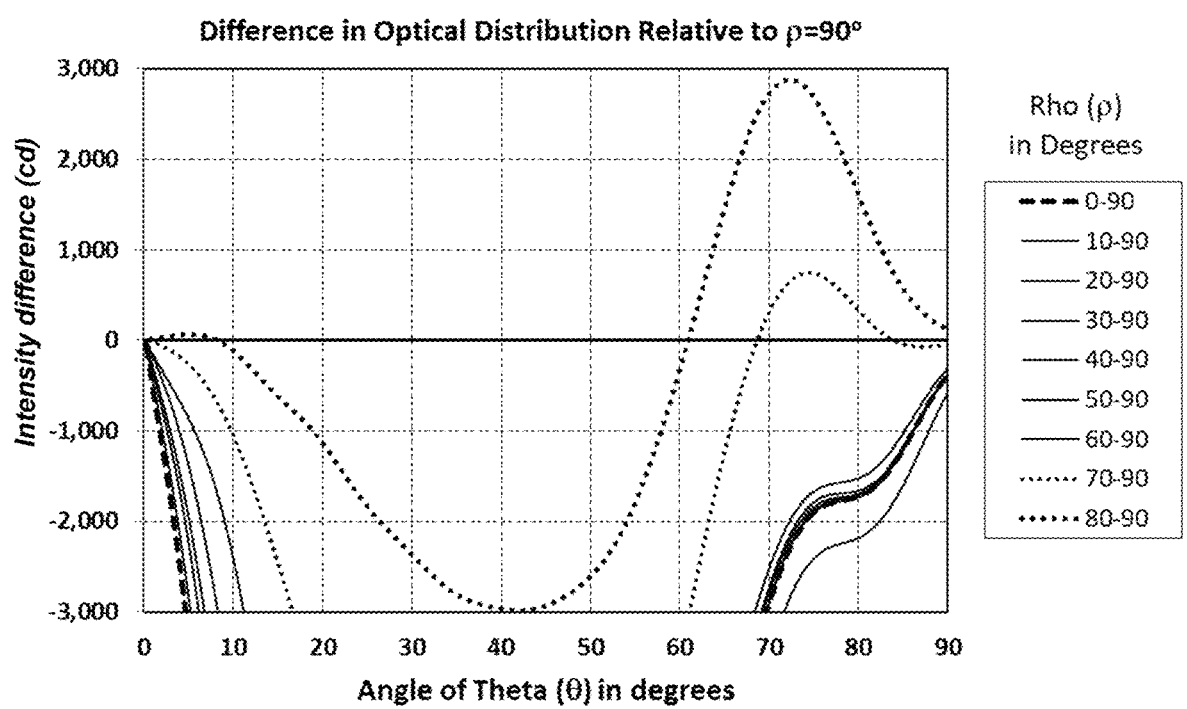
FIG. 14C is a graph that shows difference in total optical distribution for an offset plane compared against a plane orthogonal to the aisle.
Figure 14D:
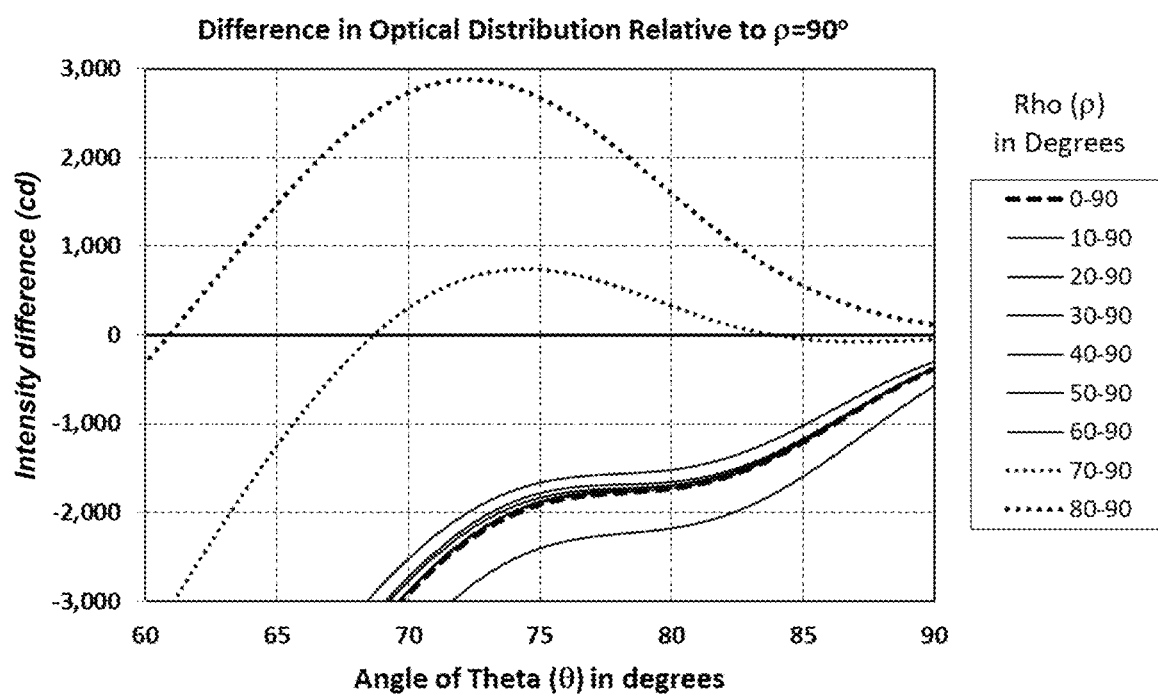
FIG. 14D is a graph that shows difference in total optical distribution for an offset plane compared against a plane orthogonal to the aisle, wherein the graph expands the angular scale in the abscissa for more detail.

FIG. 14C is a graph that shows difference in optical distribution for the $P_{offset}$ plane for different angle ρ and θ values, as used in the present disclosure, compared against the orthogonal second vertical plane P90, that is, the optical intensity of the $P_{offset}$ plane minus the optical intensity of the P90 plane. As this graph shows, over at least the 60-90 degree range for elevation angle θ, light along the offset plane $P_{offset}$ has a broader intensity distribution that exceeds the intensity of light of a second cross-section luminous intensity distribution along the orthogonal P90 plane. As can be seen from the FIG. 14C graph, for at least one angle θ that is between 60 and 90 degrees from the first optical axis, the offset cross-section luminous intensity distribution exceeds the second cross-section luminous intensity distribution along plane P90. The offset cross-section luminous intensity distribution at the at least one angle θ exceeds the second cross-section luminous intensity distribution at the same angle θ by at least 1500 cd. The graph of FIG. 14D expands the angular scale of the FIG. 14C graph along the abscissa for more detail.

Figure 14E:
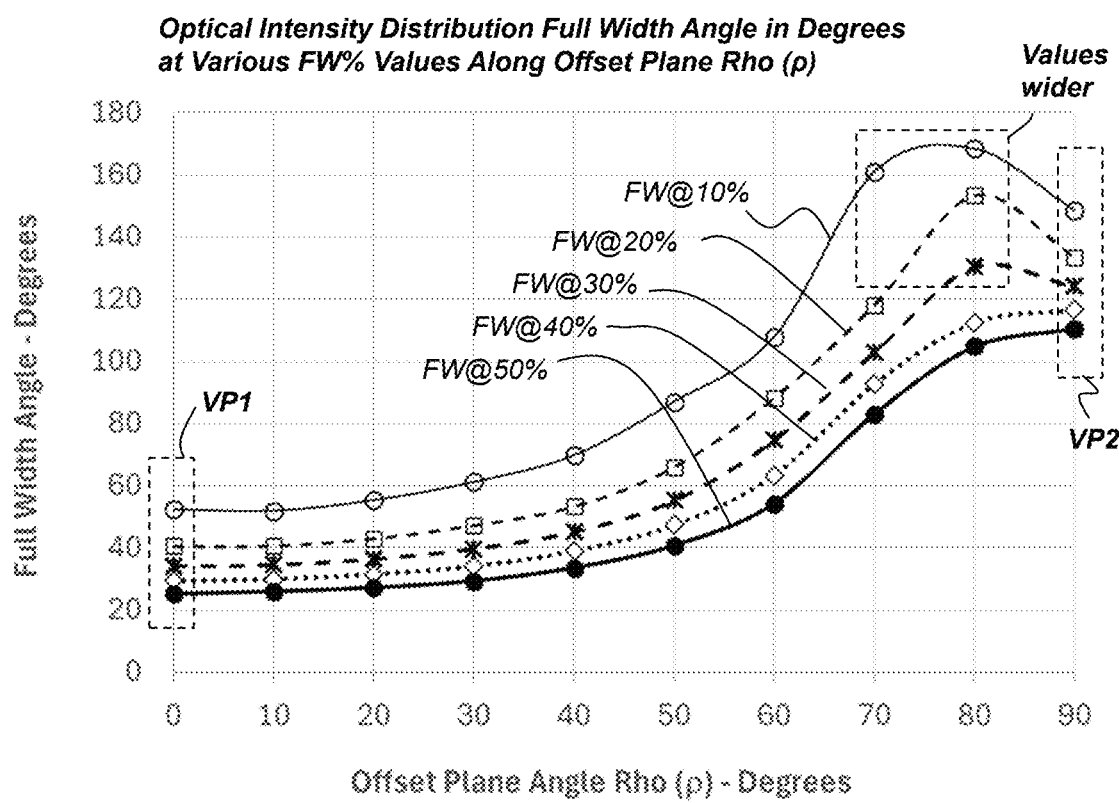
FIG. 14E is a graph that shows optical intensity distribution at various offset angles for different percentages of full width (FW) output.

FIG. 14E is a graph that shows the characteristic Full Width values of the optical intensity distribution of FIGS. 13A, 13B, and FIGS. 14A-14E at different offset plane angles ρ (Rho), X-axis and Y-axis full-width Y-axis output at different percentages of full width (FW) output. Accompanying data is given in tabular form in FIG. 14F. VP1 indicates FW values for the first vertical plane, plane P0 as shown in FIG. 4A. VP2 indicates values for the second vertical plane, plane P90 as shown in FIG. 4B. The VP2/VP1 ratio is shown in the right-most column. From the FIG. 14F table, values highlighted in black background show where measurements from the offset plane $P_{offset}$ exceed values for the orthogonal planes P0 and P90 at different full-width at center FW percentage values, wherein "center" relates to the center of the distribution, as usage of the term would be familiar to those skilled in the illumination arts.

According to an embodiment of the present disclosure, as is shown in the exemplary data of FIG. 14F, the second cross-section luminous intensity width VP2 can exceed the first cross-section luminous intensity width VP1 by at least twice at FW 10% (VP2/VP1@FW10%=148.6°/52.3°=2.8>2) and by at least three times (VP2/VP1@FW50%=110.6/25.1°=4.4>3) at FW 50% luminous intensity.

According to an embodiment of the present disclosure, the optical distribution that is obtained is substantially symmetrical along the two orthogonal planes P0 and P90. This provides a narrow distribution about the z-axis along first vertical plane P0 with full width at center (FW) values less than 40°, such as at 30°, 20°, or less. The orthogonal distribution along second vertical plane P90 is wide, with full width at center (FW) exceeding 60°, such as at 70°, 80°, 90°, 100°, 90°, 110°, or 120° for example. Along, at least one offset plane $P_{offset}$ (at angle $ρ_{off}$), optical distribution can be wider than the optical distribution along plane P90 at p=90°.

According to an embodiment of the present disclosure, there can be a wider distribution for [θ, $ρ_{off}$]−I[θ, ρ=90°] exceeding 2000 cd, or exceeding 1500 cd, 1000 cd, or 500 cd for example, wherein $ρ_{off}$ lies between 45° and 85° and elevation angle θ is between 60° and 90 degrees; or alternatively, wherein $ρ_{off}$ lies between 75° and 85° and θ is between 65° and 85 degrees.

Figure 15:
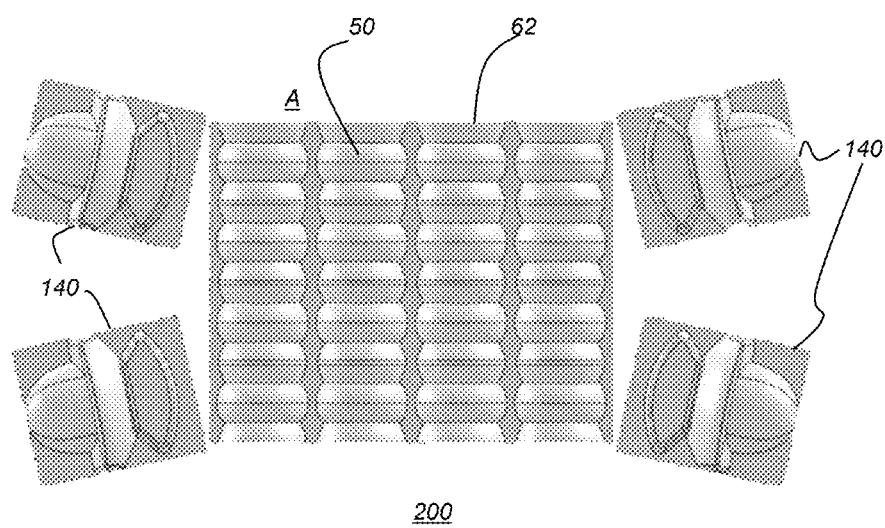
FIG. 15 is a top view of a lighting apparatus with an LED array with lenses and with directional illumination sources rotated at an offset angle on the mounting plane for redirecting light along an offset plane, according to an embodiment of the present disclosure.

FIG. 15 is a top view of a lighting apparatus 200 that shows an arrangement of an LED 62 array with first optics, lenses 50, and with second optics (directional second illumination optics) of illumination sources 140 rotated on the mounting plane for redirecting light along offset plane $P_{offset}$, according to an embodiment of the present disclosure.

Figure 16:
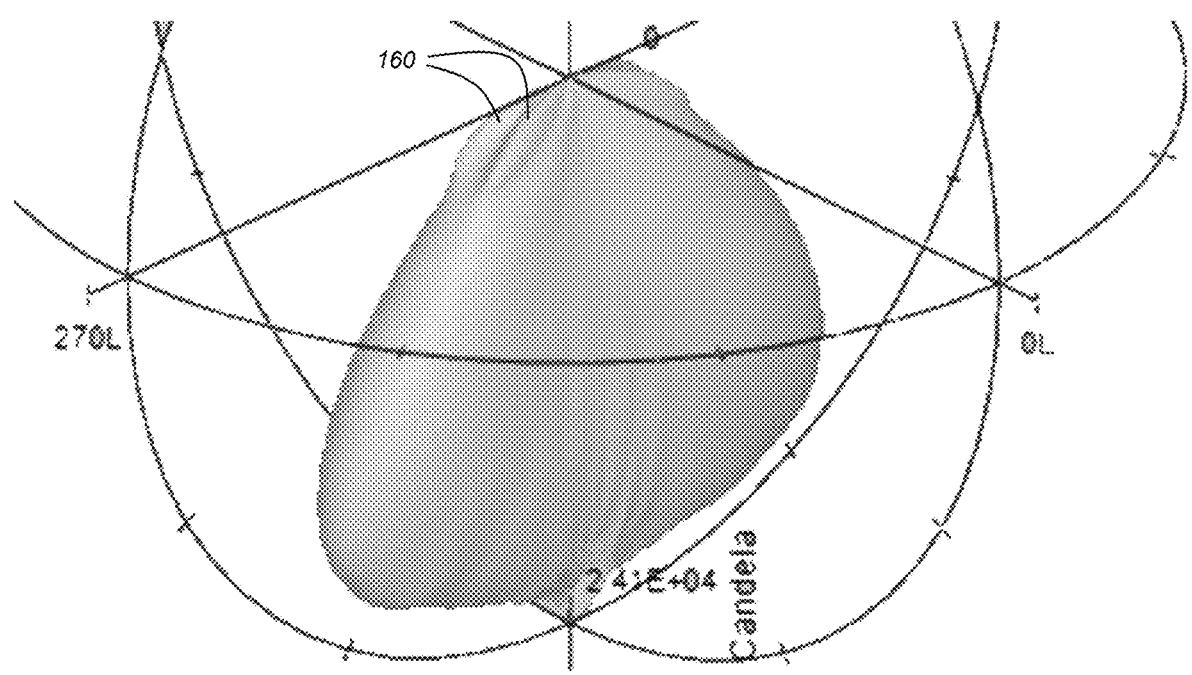
FIG. 16 is a solid-surface display representation of the luminous distribution obtained from a lighting apparatus according to an embodiment of the present disclosure.

FIG. 16 is a solid-surface 3D display representation of the luminous distribution of FIGS. 13A-13B and 14A-14E. Two irregular surface features 160 visible near the top portion of the displayed surface correspond to the added light indicated at locations K1 and K2 in FIGS. 13A and 14A.

According to an embodiment of the present disclosure, the rotation of directional second illumination sources 140 can be adjusted by the user. Adjustment can be manual or remotely controlled using a motor, for example.

The invention has been described in detail, and may have been described with particular reference to a suitable or presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. A lighting apparatus comprising:
   (a) at least a first light source mounted on a first planar surface that defines a horizontal plane, wherein the first light source defines an origin of a first optical axis that is normal to the horizontal plane,
   wherein the first optical axis defines an intersection between a first vertical plane that is orthogonal to the horizontal plane and a second vertical plane that is orthogonal to both the first vertical plane and the horizontal plane,
   wherein a first optic of the first light source forms a first optical distribution of luminous intensity that is centered along, and asymmetrical about, the first optical axis,
   and wherein the first optical distribution:
   (i) considered in cross-section with respect to the first vertical plane, is symmetric, and
   (ii) considered in cross-section with respect to the second vertical plane, is symmetric; and
   (b) at least a second light source having a second optic that forms a second optical distribution of luminous intensity that is symmetric about an offset plane that is orthogonal to the horizontal plane and wherein the offset plane is coincident to the first optical axis and is skewed from the first vertical plane by an angle ρ between 60 and 88 degrees;

and wherein the combined first optical distribution and second optical distribution form a total optical distribution that:
(i) considered in cross-section with respect to the first vertical plane has a first cross-section luminous intensity distribution having a first maximum width;
(ii) considered in cross-section with respect to the second vertical plane has a second cross-section luminous intensity distribution having a second maximum width that exceeds the first maximum width;
(iii) considered in cross-section with respect to the offset plane has an offset cross-section luminous intensity distribution having an offset width.

2. The lighting apparatus of claim 1 configured to provide the second width of at least twice the first width at 10% luminous intensity of the total optical intensity distribution and greater than three times the first width at 50% luminous intensity of the total optical intensity distribution.

3. The apparatus of claim 2 wherein at least the first width is less than 40 degrees at 30% luminous intensity of the total optical intensity distribution.

4. The apparatus of claim 2 wherein, for at least one angle $\theta$ that is between 60 and 90 degrees from the first optical axis, the offset cross-section luminous intensity distribution exceeds the second cross-section luminous intensity distribution.

5. The apparatus of claim 4 wherein the offset cross-section luminous intensity distribution at the at least one angle $\theta$ exceeds the second cross-section luminous intensity distribution at the same angle $\theta$ by at least 1500 cd.

6. The apparatus of claim 1 configured to provide the offset width, over a range of emitted light angles, wider than the second width for the offset plane that is skewed at one or more offset angles $\rho$.

7. The apparatus of claim 1 wherein the second optical distribution provides at least 5% of the total lumen output of the first optical distribution.

8. The apparatus of claim 1 wherein the at least the first light source is a light-emitting diode.

9. The apparatus of claim 1 wherein the at least the second light source is mounted on a second planar surface that is parallel to the horizontal plane.

10. The apparatus of claim 1 configured to provide the second cross-section luminous intensity distribution having a first optical lobe centered along a second optical axis that extends from 60 to 90 degrees from the first optical axis.

11. The apparatus of claim 10 further configured to provide a second optical lobe that is symmetrical about the second vertical plane to the first optical lobe.

12. The apparatus of claim 11 further configured to provide a third optical lobe that is symmetrical about the first vertical plane to the first optical lobe.

13. The apparatus of claim 12 further configured to provide a fourth optical lobe that is symmetrical about the second vertical plane to the first and third optical lobes.

14. A method of illuminating a corridor, the method comprising:
mounting, at a first height above a floor surface, at least a first lighting apparatus that has one or more light sources that lie along a horizontal plane and that define a first optical axis that is normal to the horizontal plane and that extends toward the floor surface of the corridor that is parallel to the horizontal plane,
wherein, the first optical axis further defines an intersection between a first vertical plane that is orthogonal to the horizontal plane and extends across the corridor and a second vertical plane that is orthogonal to both the first vertical plane and the horizontal plane and extends along the corridor;
configuring the first lighting apparatus to provide a total distribution of light that has a luminous intensity that is centered upon, and asymmetrical about, the first optical axis,
wherein the total distribution of light:
(i) considered in cross-section with respect to the first vertical plane has a first cross-section luminous intensity distribution with a first width, wherein the first full width at 50% maximum luminous intensity of the first cross-section luminous intensity distribution spans less than 40 degrees and wherein the first full width at 10% maximum luminous intensity of the first cross-section luminous intensity distribution spans less than 67 degrees;
(ii) considered in cross-section with respect to the second vertical plane has a second cross-section luminous intensity distribution with a second width that exceeds the first width,
wherein the second full width at 50% maximum luminous intensity of the second cross-section luminous intensity distribution is between 63 and 120 degrees and the second full width at 10% maximum luminous intensity of the second cross-section luminous intensity distribution is between 141 and 170 degrees.

15. The method of claim 14 wherein the second width exceeds the first width by at least twice at full width at 10% maximum luminous intensity and at least three times at full width at 50% maximum luminous intensity.

16. The method of claim 14 wherein configuring the total distribution of light from the first light apparatus further comprises, when considered with respect to an offset plane that is orthogonal to the horizontal plane and coincident to the first optical axis and is further skewed from the first vertical plane by an angle between 60 and 88 degrees, providing an offset cross-section luminous intensity distribution wherein, for at least one angle $\theta$ between 60 and 90 degrees from the first optical axis, the offset cross-section luminous intensity distribution exceeds the second cross-section luminous intensity distribution at the same angle $\theta$.

17. The method of claim 16 wherein the offset cross-section luminous intensity distribution at angle $\theta$ exceeds the second cross-section luminous intensity distribution at the same angle $\theta$ by at least 1500 cd.

18. A lighting apparatus comprising:
(a) at least one light emitter mounted on a first planar surface that defines a horizontal plane, wherein the at least one light emitter defines an origin of a first optical axis that is normal to the horizontal plane,
wherein the first optical axis defines an intersection between a first vertical plane that is orthogonal to the horizontal plane and a second vertical plane that is orthogonal to both the first vertical plane and the horizontal plane,
wherein an offset plane is defined that is orthogonal to the horizontal plane and coincident to the first optical axis and is skewed from the first vertical plane by an angle $\rho$ between 60 and 88 degrees; and
(b) at least one optic that is configured to direct light from the at least one light emitter to form a total optical distribution of luminous intensity that is centered upon, and asymmetrical about, the first optical axis,
wherein the total optical distribution:

(i) considered in cross-section with respect to the first vertical plane, is symmetric, and has a first cross-section luminous intensity distribution with a first width and a first maximum luminous intensity,
(ii) considered in cross-section with respect to the second vertical plane has second cross-section luminous intensity distribution with a second width and a second maximum luminous intensity, wherein the second cross-section luminous intensity distribution exceeds the first width by at least 2× at full width at 10% total maximum luminous intensity, and that exceeds the first width by more than 3× at full width at 50% total maximum luminous intensity;
(iii) considered in cross-section with respect to the offset plane has an offset cross-section luminous intensity distribution with an offset width that exceeds the second width.

19. The apparatus of claim 18 wherein the first width at 50% first maximum luminous intensity is less than 40 degrees and the first width at 10% first maximum luminous intensity is less than 67 degrees.

20. The apparatus of claim 19 wherein the second width at 50% maximum second luminous intensity is between 63 to 125 degrees and the second width at 10% maximum second luminous intensity is between 141 to 175 degrees.

* * * * *